US011895557B2

(12) United States Patent
Soto et al.

(10) Patent No.: US 11,895,557 B2
(45) Date of Patent: *Feb. 6, 2024

(54) SYSTEMS AND METHODS FOR TARGET DEVICE PREDICTION

(71) Applicant: Sonos, Inc., Santa Barbara, CA (US)

(72) Inventors: Kurt Thomas Soto, Ventura, CA (US); Charles Conor Sleith, Waltham, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/453,822

(22) Filed: Nov. 5, 2021

(65) Prior Publication Data

US 2022/0124452 A1 Apr. 21, 2022

Related U.S. Application Data

(63) Continuation of application No. 16/672,280, filed on Nov. 1, 2019, now Pat. No. 11,172,329.

(Continued)

(51) Int. Cl.
*H04W 4/02* (2018.01)
*H04B 17/27* (2015.01)
(Continued)

(52) U.S. Cl.
CPC ............ *H04W 4/023* (2013.01); *G06F 3/048* (2013.01); *G06F 3/0481* (2013.01);
(Continued)

(58) Field of Classification Search
CPC ...... H04W 4/023; G06F 3/048; G06F 3/0481; G06F 3/04847; G06F 3/0488;
(Continued)

(56) References Cited

U.S. PATENT DOCUMENTS

| 8,234,395 B2 | 7/2012 | Millington |
| 8,483,853 B1 | 7/2013 | Lambourne |

(Continued)

FOREIGN PATENT DOCUMENTS

| WO | 2021062390 A2 | 4/2021 |
| WO | 2021062390 A3 | 5/2021 |

OTHER PUBLICATIONS

International Preliminary Report on Patentability for International Application PCT/US2020/053129, Report issued Mar. 15, 2022, dated Apr. 7, 2022, 16 Pgs.

(Continued)

*Primary Examiner* — Pei Yong Weng
(74) *Attorney, Agent, or Firm* — Finch & Maloney PLLC

(57) ABSTRACT

Systems and methods for training prediction models are illustrated. One embodiment includes a method for training a prediction model in a network. The method includes steps for receiving context data for a portable device in a system, wherein the context data includes localization data that describes a location of the portable device, identifying a predicted stationary device from several stationary devices that is predicted based on the context data using a prediction model, receiving input identifying a target stationary device from the several stationary devices, generating training data based on the predicted stationary device and the received input, updating the prediction model based on the generated training data.

21 Claims, 19 Drawing Sheets

Related U.S. Application Data

(60) Provisional application No. 62/907,367, filed on Sep. 27, 2019.

(51) Int. Cl.

| | | |
|---|---|---|
| *H04B 17/318* | (2015.01) | |
| *G06F 3/04847* | (2022.01) | |
| *G08C 17/02* | (2006.01) | |
| *G06F 3/0488* | (2022.01) | |
| *G06F 3/048* | (2013.01) | |
| *H04N 21/2387* | (2011.01) | |
| *H04N 21/472* | (2011.01) | |
| *G06N 20/00* | (2019.01) | |
| *G06F 3/0481* | (2022.01) | |
| *G06F 3/04883* | (2022.01) | |
| *G06F 3/16* | (2006.01) | |
| *G06N 5/04* | (2023.01) | |

(52) U.S. Cl.
CPC ........ *G06F 3/0488* (2013.01); *G06F 3/04847* (2013.01); *G06F 3/04883* (2013.01); *G06F 3/165* (2013.01); *G06N 5/04* (2013.01); *G06N 20/00* (2019.01); *G08C 17/02* (2013.01); *H04B 17/27* (2015.01); *H04B 17/318* (2015.01); *H04N 21/2387* (2013.01); *H04N 21/47217* (2013.01); *G08C 2201/34* (2013.01); *G08C 2201/91* (2013.01)

(58) Field of Classification Search
CPC ...... G06F 3/04883; G06F 3/165; G06F 3/167; G06N 5/04; G06N 20/00; G06N 7/005; G08C 17/02; G08C 2201/34; G08C 2201/91; H04B 17/27; H04B 17/318; H04N 21/2387; H04N 21/47217; H04N 21/25841; H04N 21/4122; H04N 21/43615; H04N 21/44227; H04R 2227/005; H04R 2420/07; H04R 27/00
See application file for complete search history.

(56) References Cited

U.S. PATENT DOCUMENTS

| | | | |
|---|---|---|---|
| 9,084,058 B2 | 7/2015 | Reilly et al. | |
| 9,137,559 B2 | 9/2015 | Sofos et al. | |
| 9,949,054 B2 | 4/2018 | Kadri et al. | |
| 9,978,390 B2 | 5/2018 | Shih | |
| 10,499,181 B1 | 12/2019 | Ramalingam | |
| 10,679,673 B2 | 6/2020 | Møller et al. | |
| 10,686,858 B1 | 6/2020 | Gandhi et al. | |
| 11,172,328 B2 | 11/2021 | Soto et al. | |
| 11,172,329 B2 | 11/2021 | Soto et al. | |
| 11,533,116 B2 | 12/2022 | van Erven et al. | |
| 2006/0085177 A1* | 4/2006 | Toyama | G01C 21/26 703/22 |
| 2006/0092037 A1* | 5/2006 | Neogi | G08C 23/04 340/4.3 |
| 2007/0253583 A1 | 11/2007 | Melanson | |
| 2015/0081068 A1 | 3/2015 | Cheng | |
| 2016/0088036 A1 | 3/2016 | Corbin et al. | |
| 2016/0088438 A1 | 3/2016 | O'Keeffe | |
| 2016/0241976 A1 | 8/2016 | Pearson | |
| 2017/0142535 A1 | 5/2017 | Aggarwal et al. | |
| 2017/0171577 A1 | 6/2017 | Kipp | |
| 2017/0236512 A1 | 8/2017 | Williams et al. | |
| 2017/0242653 A1 | 8/2017 | Lang et al. | |
| 2017/0265017 A1 | 9/2017 | Katayama | |
| 2017/0337273 A1 | 11/2017 | Iyer et al. | |
| 2018/0047394 A1 | 2/2018 | Tian et al. | |
| 2018/0107446 A1 | 4/2018 | Wilberding et al. | |
| 2019/0295386 A1 | 9/2019 | Roberts | |
| 2020/0064456 A1 | 2/2020 | Xu et al. | |
| 2020/0077222 A1 | 3/2020 | Nguyen et al. | |
| 2020/0092515 A1 | 3/2020 | Stern et al. | |
| 2020/0382647 A1 | 12/2020 | Krochmal et al. | |
| 2021/0049911 A1* | 2/2021 | Fremlin | G08G 1/202 |
| 2021/0097435 A1 | 4/2021 | Soto et al. | |
| 2021/0099736 A1 | 4/2021 | Soto | |
| 2021/0099829 A1 | 4/2021 | Soto et al. | |
| 2021/0297168 A1 | 9/2021 | Van Erven et al. | |
| 2022/0060850 A1 | 2/2022 | Soto et al. | |
| 2023/0112654 A1 | 4/2023 | Van Erven et al. | |

OTHER PUBLICATIONS

International Search Report and Written Opinion for International Application No. PCT/US2020/053129, Search completed Jan. 15, 2021, dated Mar. 22, 2021, 23 pgs.

Invitation to Pay Additional Fees and Partial Search Report Received for International Application PCT/US2020/053129, dated Jan. 27, 2021, 18 pgs.

Al-Qaness et al., "Channel State Information from Pure Communication to Sense and Track Human Motion: A Survey", Sensors, Jul. 29, 2019, vol. 19, Issue 15, doi:10.3390/s19153329, 27 pgs.

Coleman, "OFDM and OFDMA Subcarriers—What Are the Differences?", Obtained from https://www.extremenetworks.com/extreme-networks-blog/ofdm-and-ofdma-subcarriers-what-are-the-differences/, Published Oct. 15, 2019, Printed May 12, 2020, 5 pages.

Gosai et al., "Real Time Location Based Tracking Using WIFI Signals", International Journal of Computer Applications, Sep. 2014, vol. 101, No. 5, pp. 21-26.

Kitasuka et al., "Positioning Technique of Wireless LAN Terminals Using RSSI Between Terminals", Proceedings of the 2005 International Conference on Pervasive Systems and Computing, PSC 2005, Las Vegas, Nevada, Jun. 27-30, 2005, 7 pgs.

Ma et al., "WiFi Sensing with Channel State Information: A Survey", ACM Computing Surveys, Jul. 2019, vol. 52, Issue 3, Article No. 46, pp. 1-36, https://doi.org/10.1145/3310194.

Maduskar et al., "RSSI based adaptive indoor location tracker", Scientific Phone Apps and Mobile Devices, Open Access, 2017, vol. 3, No. 3, pp. 1-8.

Wu et al., "Non-Invasive Detection of Moving and Stationary Human With WiFi", IEEE Journal on Selected Areas in Communications, Nov. 2015, vol. 33, No. 11, pp. 2329-2342, doi: 10.1109/JSAC.2015.2430294.

\* cited by examiner

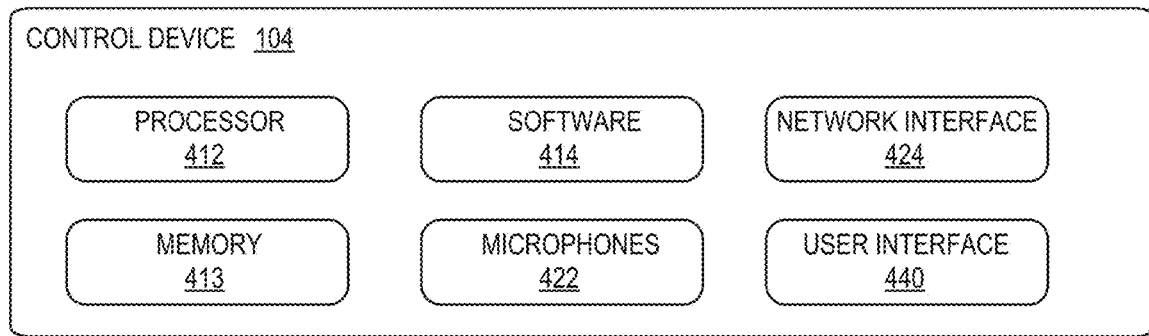
*Figure 4A*
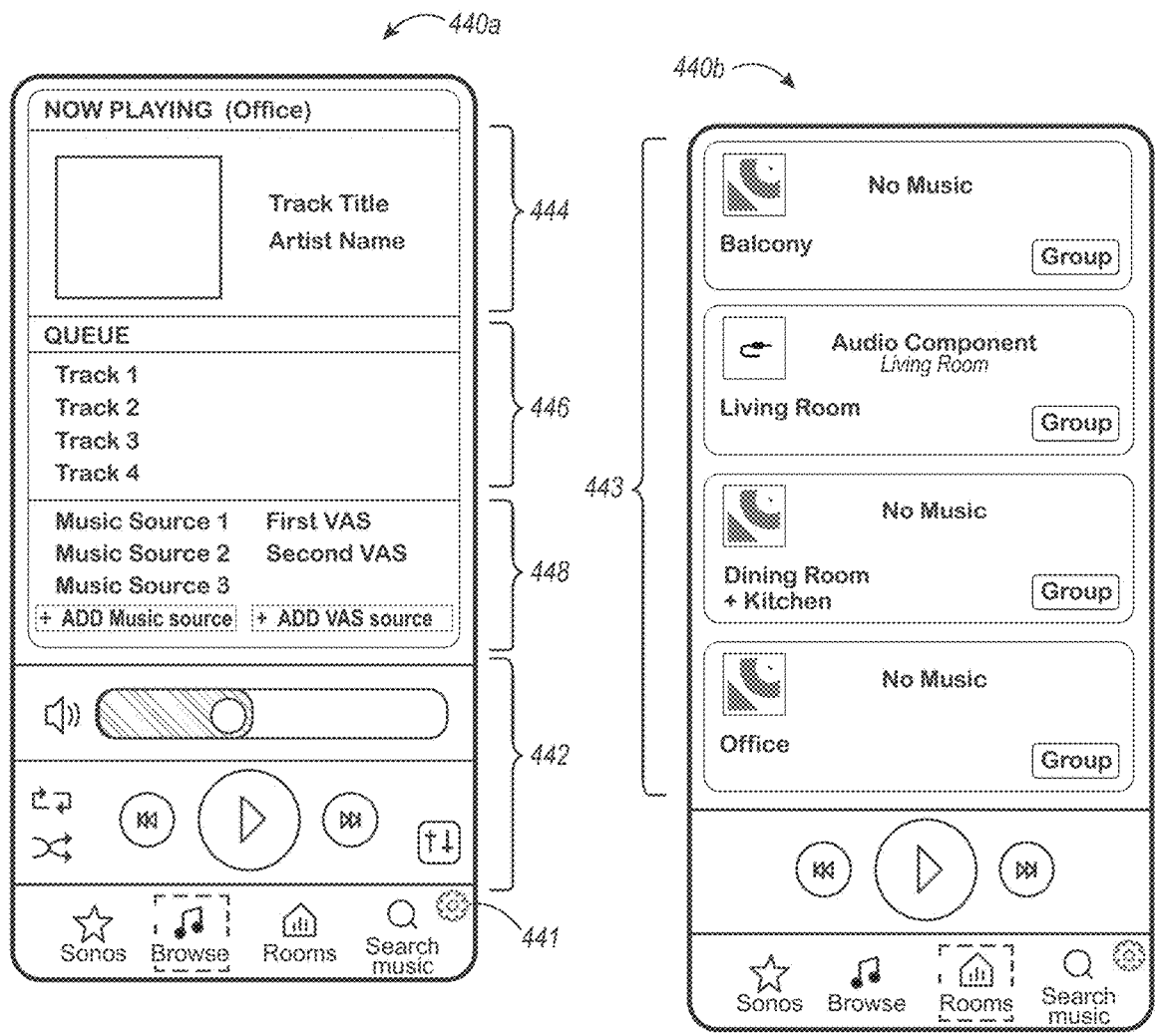
*Figure 4B*
*Figure 4C*

```
{"thid":"Sonos_243werg509682345sdfbser",
 "event_start_utc":"2019-08-27_23:18:10.638846",
 "event_end":"2019-08-27_23:20:10.753748",
 "players_detected":["7828CAAAAAAB", "80E1415D17FB", "7828CA000000", "7828CA000555", "7828CA111111"],
 "controller":"80E1415D17FB",
 "choice":"7828CAAAAAAB",
 "freq":"2412",
 "model_type":"physical",
 "probability":[0.35, 0.2, 0.25, 0.1, 0.1],
 "ra_mean":[[  58.6,  0, 50.5, 46.2, 43.4, 57.5],
            [  49.9, 58.4,  0,  61.4, 50.8, 52.2, 55.1],
            [  43.2, 47.6, 55.3,  0,  58.5, 51.6, 49.0],
            [  42.8, 52.7, 48.8, 50.1,  0,  46.4, 42.1],
            [  58.6,  0, 50.5, 46.2, 43.4, 57.5],
            [  49.9, 58.4,  0,  61.4, 50.8, 52.2, 55.1],
            [  43.2, 47.6, 55.3,  0,  58.5, 51.6, 49.0],
            [  42.8, 52.7, 48.8, 50.1,  0,  46.4, 34.2]],
 "ra_var":[[  0, 3.1, 2.2, 3.1, 3.4, 1.2],
           [  2.8,  0, 3.1, 3.3, 3.0, 1.7, 1.2],
           [  2.8, 3.1,  0, 3.0, 2.4, 1.7, 1.2],
           [  1.1, 3.1, 2.2, 2.4,  0, 2.2, 1.2],
           [  0, 3.1, 2.2, 3.1, 3.4, 1.2],
           [  2.8,  0, 3.1, 3.3, 3.0, 1.7, 1.2],
           [  2.8, 3.1,  0, 3.0, 2.4, 1.7, 1.2],
           [  1.1, 3.1, 2.2, 2.4,  0, 2.2, 1.2]],
 "r0_mean":[[...]],
 "r0_var":[[...]],
 "time_start":[[ 0, 645206187, 648205789, 645175486, 645206187, 648348429],
               [645175486,  0, 645206187, 648205789, 645206187, 648348429],
               [645175486, 645206187,  0, 648205789, 645206187, 648348429],
               [645175486, 645206187, 645206187,  0, 648205789, 648348429],
               [ 0, 645206187, 648205789, 645175486, 645206187, 648348429],
               [645175486,  0, 645206187, 648205789, 645206187, 648348429],
               [645175486, 645206187,  0, 648205789, 645206187, 648348429],
               [645175486, 645206187, 645206187,  0, 648205789, 648348429]],
 "time_end":[[ 0, 645206187, 648205789, 645175486, 645206187, 648348429],
             [645175486,  0, 645206187, 648205789, 645206187, 648348429],
             [645175486, 645206187,  0, 648205789, 645206187, 648348429],
             [645175486, 645206187, 645206187,  0, 648205789, 648348429]]}
```

FIG. 8

SYSTEMS AND METHODS FOR TARGET DEVICE PREDICTION

CROSS-REFERENCE TO RELATED APPLICATIONS

The current application is a continuation of U.S. patent application Ser. No. 16/672,280 entitled "Systems and Methods for Target Device Prediction" filed Nov. 1, 2019, which claims the benefit of and priority under 35 U.S.C. § 119(e) to U.S. Provisional Patent Application No. 62/907,367 entitled "Systems and Methods for Device Localization and Prediction" filed Sep. 27, 2019, the disclosures of which are hereby incorporated by reference in their entireties for all purposes.

TECHNICAL FIELD

The present technology relates to consumer goods and, more particularly, to methods, systems, products, features, services, and other elements directed to localization and/or target device prediction in media playback systems or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The SONOS Wireless HiFi System enables people to experience music from many sources via one or more networked playback devices. Through a software control application installed on a smartphone, tablet, or computer, one can play what he or she wants in any room that has a networked playback device. Additionally, using a controller, for example, different songs can be streamed to each room that has a playback device, rooms can be grouped together for synchronous playback, or the same song can be heard in all rooms synchronously.

Given the ever-growing interest in digital media, there continues to be a need to develop consumer-accessible technologies to further enhance the listening experience.

SUMMARY

Systems and methods for localizing portable devices are illustrated. One embodiment includes a method for locating a portable device in a network that includes several reference devices. The method includes steps for measuring characteristics of signals transmitted via signal paths between each of several reference devices over a period of time, measuring characteristics of signals transmitted via signal paths between a portable device and each of the several reference devices, normalizing the measurements to estimate characteristics of the signal paths between each of the several reference devices and between the portable device and each of the reference devices, and estimating the likelihood that the portable device is in a particular location using the estimated characteristics of the signal paths between each of the several reference devices and the estimated characteristics of the signal paths between the portable device and each of the several reference devices.

In a further embodiment, at least some of the several reference devices include different transmitter implementations.

In still another embodiment, the portable device has a transmitter implementation that differs from the transmitter implementations of at least one of the reference devices.

In a still further embodiment, the measured characteristics of a particular signal includes at least one of a received signal strength indicator (RSSI) value, an identifier for a sending reference device that transmitted the particular signal, and a timestamp for the particular signal.

In yet another embodiment, estimating the likelihood includes computing a set of probabilities that the portable device is near each of at least one reference device of the several reference devices.

In a yet further embodiment, normalizing the measurements for a first reference device comprises calculating a first signal-strength ratio of signals received at the first reference device from the portable device to signals received at the first reference device from a second reference device, and calculating a second signal-strength ratio of signals received at the second reference device from the portable device to signals received at the second reference device from the first reference device, wherein computing the set of probabilities for the first reference device includes computing a ratio of the first signal-strength ratio to the second signal-strength ratio.

In another additional embodiment, normalizing the measurements for a first reference device comprises calculating a first signal-strength ratio of signals received at the first reference device from the portable device to signals received at the first reference device from a second reference device, and calculating a second signal-strength ratio of signals received at a third reference device from the portable device to signals received at the third reference device from the second reference device, wherein computing the set of probabilities for the first reference device includes computing a ratio of the first signal-strength ratio to the second signal-strength ratio.

In a further additional embodiment, computing the set of probabilities comprises identifying an offset based on a difference in RSSI values for the first signal path and the second signal path, and determining a normalized set of one or more RSSI values for the first and second signal paths based on the identified offset.

In another embodiment again, normalizing the measurements to estimate characteristics of a particular signal path between a first reference device and a second reference device includes computing a weighted average of at least one characteristic for a first set of one or more signals from the first reference device to the second reference device and a second set of one or more signals from the second reference device to the first reference device.

In a further embodiment again, the weighted average is weighted based on timestamps associated with the first and second sets of signals.

In still yet another embodiment, the method further includes steps for estimating which of the reference devices is closest to the portable device based on the estimated likelihood.

In a still yet further embodiment, the method further includes steps for selecting a computing reference device of the several reference devices for performing the steps of normalizing the measurements and estimating the likelihood.

In still another additional embodiment, selecting the computing reference device includes identifying an idle reference device of the several reference devices.

In a still further additional embodiment, selecting the computing reference device includes identifying an infrequently-used reference device of the several reference devices.

In still another embodiment again, the method further includes steps for identifying a nearest reference device from the set of reference devices based on the estimated likelihood, and transferring audio playing at the portable device to play at the nearest reference device.

In a still further embodiment again, the method further includes steps for determining a change in location based on changes in the estimated likelihood over a duration of time.

One embodiment includes a method for locating a portable device in a media playback system includes several reference devices. The method includes steps for measuring characteristics of signals transmitted via signal paths between each of several reference devices over a period of time, wherein the several reference devices includes several reference playback devices. The method further includes steps for measuring characteristics of signals transmitted via signal paths between a portable device and each of the several reference devices. The method includes steps for normalizing the measurements to estimate characteristics of the signal paths between each of the several reference devices and between the portable device and each of the reference devices. The method also includes steps for estimating the likelihood that the portable device is in a particular location using the estimated characteristics of the signal paths between each of the several reference devices and the estimated characteristics of the signal paths between the portable device and each of the several reference devices. The method includes steps for identifying a target reference playback device of the several reference devices based on the estimated likelihood.

In a further embodiment, at least some of the several reference devices include different transmitter implementations.

In still another embodiment, the portable device has a transmitter implementation that differs from the transmitter implementations of at least one of the reference devices.

In a still further embodiment, the measured characteristics of a particular signal includes at least one of a received signal strength indicator (RSSI) value, an identifier for a sending reference device that transmitted the particular signal, and a timestamp for the particular signal.

In yet another embodiment, estimating the likelihood includes computing a set of probabilities that the portable device is near each of at least one reference device of the several reference devices.

In a yet further embodiment, normalizing the measurements for a first reference device comprises calculating a first signal-strength ratio of signals received at the first reference device from the portable device to signals received at the first reference device from a second reference device, and calculating a second signal-strength ratio of signals received at the second reference device from the portable device to signals received at the second reference device from the first reference device, wherein computing the set of probabilities for the first reference device includes computing a ratio of the first signal-strength ratio to the second signal-strength ratio.

In another additional embodiment, normalizing the measurements for a first reference device comprises calculating a first signal-strength ratio of signals received at the first reference device from the portable device to signals received at the first reference device from a second reference device, and calculating a second signal-strength ratio of signals received at a third reference device from the portable device to signals received at the third reference device from the second reference device, wherein computing the set of probabilities for the first reference device includes computing a ratio of the first signal-strength ratio to the second signal-strength ratio.

In a further additional embodiment, computing the set of probabilities comprises identifying an offset based on a difference in RSSI values for the first signal path and the second signal path, and determining a normalized set of one or more RSSI values for the first and second signal paths based on the identified offset.

In another embodiment again, normalizing the measurements to estimate characteristics of a particular signal path between a first reference device and a second reference device includes computing a weighted average of at least one characteristic for a first set of one or more signals from the first reference device to the second reference device and a second set of one or more signals from the second reference device to the first reference device.

In a further embodiment again, the weighted average is weighted based on timestamps associated with the first and second sets of signals.

In still yet another embodiment, the method further includes steps for estimating which of the reference devices is closest to the portable device based on the estimated likelihood.

In a still yet further embodiment, the method further includes steps for selecting a computing reference device of the several reference devices for performing the steps of normalizing the measurements and estimating the likelihood.

In still another additional embodiment, selecting the computing reference device includes identifying an idle reference device of the several reference devices.

In a still further additional embodiment, selecting the computing reference device includes identifying an infrequently-used reference device of the several reference devices.

In still another embodiment again, the method further includes steps for identifying a nearest reference device from the set of reference devices based on the estimated likelihood, and transferring audio playing at the portable device to play at the nearest reference device.

In a still further embodiment again, the method further includes steps for determining a change in location based on changes in the estimated likelihood over a duration of time.

In yet another additional embodiment, the several reference devices further includes a set of one or more controller devices for controlling playback devices in the media playback system.

One embodiment includes a playback device including one or more amplifiers configured to drive one or more speakers, one or more processors, and data storage having stored therein instructions executable by the one or more processors to cause the playback device to perform a method. The method includes steps for obtaining characteristics of signals transmitted via signal paths between each of several reference playback devices in a media playback system over a period of time, obtaining characteristics of signals transmitted via signal paths between a portable device and each of the several reference playback devices, and normalizing the measurements to estimate characteristics of the signal paths between each of the several reference devices and between the portable device and each of the reference devices. The method further includes steps for estimating the likelihood that the portable device is in a particular location using the estimated characteristics of the signal paths between each of the several reference devices and the estimated characteristics of the signal paths between the portable device and each of the several reference devices, identifying a set of one or more target reference playback devices of the several reference devices based on the estimated likelihood, and transmitting the set of target reference playback devices to the portable device. The portable device modifies a user interface at the portable device based on the ranked listing.

In a yet further additional embodiment, the playback device is one of the several reference playback devices.

One embodiment includes a controller device that includes a display configured to display a graphical user interface, one or more processors, and data storage having stored therein instructions executable by the one or more processors to cause the controller device to perform a method. The method includes steps for obtaining characteristics of signals transmitted via signal paths between each of several reference playback devices in the media playback system over a period of time, obtaining characteristics of signals transmitted via signal paths between the controller device and each of the several reference playback devices, and normalizing the measurements to estimate characteristics of the signal paths between each of the several reference devices and between the portable device and each of the reference devices. The process further includes steps for estimating the likelihood that the portable device is in a particular location using the estimated characteristics of the signal paths between each of the several reference devices and the estimated characteristics of the signal paths between the portable device and each of the several reference devices, identifying a set of one or more target reference playback devices of the several reference devices based on the estimated likelihood, and modifying the graphical user interface displayed on the display based on the identified set of target reference playback devices.

One embodiment includes a method for locating a portable device in a media playback system includes several reference devices. The method includes steps for receiving characteristics of signals transmitted via signal paths between each of several reference devices over a period of time, wherein the several reference devices includes several reference playback devices, receiving characteristics of signals transmitted via signal paths between a portable device and each of the several reference devices, and normalizing the measurements to estimate characteristics of the signal paths between each of the several reference devices and between the portable device and each of the reference devices. The method further includes steps for estimating the likelihood that the portable device is in a particular location using the estimated characteristics of the signal paths between each of the several reference devices and the estimated characteristics of the signal paths between the portable device and each of the several reference devices, and identifying a set of one or more target reference playback devices of the several reference devices based on the estimated likelihood.

In yet another embodiment again, the method is performed by the portable device.

In a yet further embodiment again, the method further includes steps for modifying a user interface at the portable device based on the identified set of target reference playback devices.

In another additional embodiment again, modifying the user interface includes at least one of the group of highlighting the set of target reference playback devices and reordering a listing of reference playback devices.

In a further additional embodiment again, the method is performed by a reference device of the several reference devices.

In still yet another additional embodiment, the method further includes steps for transmitting the set of target reference playback devices to the portable device, wherein the portable device modifies a user interface at the portable device based on the ranked listing.

In a further embodiment, transmitting the set of target reference devices includes transmitting a ranked list of the set of target reference playback devices, wherein the portable device modifies a display order of the target reference playback devices based on the ranked list.

In still another embodiment, the portable device modifies the user interface to emphasize at least one target reference playback device of the set of target reference playback devices.

Device Prediction

Systems and methods for training prediction models are illustrated. One embodiment includes a method for training a prediction model in a network. The method includes steps for receiving context data for a portable device in a system, wherein the context data includes localization data that describes a location of the portable device, identifying a predicted stationary device from several stationary devices that is predicted based on the context data using a prediction model, receiving input identifying a target stationary device from the several stationary devices, generating training data based on the predicted stationary device and the received input, updating the prediction model based on the generated training data.

In yet another additional embodiment, the localization data includes a matrix of probabilities.

In a yet further additional embodiment, selecting the predicted stationary device comprises providing a set of inputs to the prediction model, the set of inputs includes the received localization data, and generating probabilities for each stationary device of the several stationary devices using the prediction model.

In yet another embodiment again, selecting the predicted stationary device further includes selecting the stationary device with a highest probability.

In a yet further embodiment again, selecting the predicted stationary device further includes transmitting a control signal to the predicted stationary device.

In another additional embodiment again, selecting the predicted stationary device further comprises ranking at least a subset of the several stationary devices based on the generated probabilities, and providing an ordered listing of the several stationary devices to the portable device based on the ranking, wherein the portable device presents the ordered listing in a user interface of the portable device.

In a further additional embodiment again, receiving input identifying a target stationary device includes receiving a control command from the target stationary device.

In still yet another additional embodiment, receiving input identifying a target stationary device includes receiving a selection of the target stationary device from the portable device.

In a further embodiment, generating the training data includes storing the context data as a training data sample and an identification of the target stationary device as a label for the training data sample.

In still another embodiment, updating the prediction model comprises passing the training data sample through the prediction model to generate probabilities for each stationary device of the several stationary devices, computing a loss based on the generated probabilities and the target stationary device, and updating weights of the prediction model based on the computed loss.

In a still further embodiment, generating the training data further includes storing the predicted stationary device, wherein updating the prediction model comprises computing a loss based on the predicted stationary device and the target stationary device, and updating weights of the prediction model based on the computed loss.

In yet another embodiment, the context data further includes at least one of a time of day, day of the week, and a user identity.

One embodiment includes a method for training a prediction engine. The method includes steps for monitoring a system includes several devices, determining whether to capture training data, identifying a true user interaction, identifying a predicted user interaction from a prediction model, and generating training data based on the true user interaction and the predicted user interaction.

In a yet further embodiment, monitoring the system includes localizing a portable device within a system to determine a probability matrix, wherein the probability matrix indicates likelihoods that the portable device is nearest to each of the several devices, wherein identifying the predicted user interaction includes feeding the probability matrix as an input to the prediction model.

In another additional embodiment, the method further includes steps for gathering context data, wherein the context data includes a set of data from the group consisting of user data, system state data, and localization data.

In a further additional embodiment, monitoring the system includes localizing a portable device in the system, and determining whether to capture training data includes determining whether a confidence level for the localizing of the portable device exceeds a threshold value.

One embodiment includes a method for training a prediction model in a media playback system. The method includes steps for receiving context data for a portable device in the media playback system, wherein the context data includes localization data that describes a location of the portable device, identifying a predicted stationary playback device from several stationary playback devices that is predicted based on the context data using a prediction model, and receiving input identifying a target stationary playback device from the several stationary playback devices. The method further includes steps for generating training data based on the predicted stationary playback device and the received input, and updating the prediction model based on the generated training data.

In a further embodiment, the localization data includes a matrix of probabilities.

In still another embodiment, selecting the predicted stationary playback device comprises providing a set of inputs to the prediction model, the set of inputs includes the received localization data, and generating probabilities for each stationary playback device of the several stationary playback devices using the prediction model.

In a still further embodiment, selecting the predicted stationary playback device further includes selecting the stationary playback device with a highest probability.

In yet another embodiment, selecting the predicted stationary playback device further includes transmitting a control signal to the predicted stationary playback device.

In a yet further embodiment, selecting the predicted stationary playback device further comprises ranking at least a subset of the several stationary playback devices based on the generated probabilities, and providing an ordered listing of the several stationary playback devices to the portable device based on the ranking, wherein the portable device presents the ordered listing in a user interface of the portable device.

In another additional embodiment, receiving input identifying a target stationary playback device includes receiving a control command from the target stationary playback device.

In a further additional embodiment, receiving input identifying a target stationary playback device includes receiving a selection of the target stationary playback device from the portable device.

In another embodiment again, generating the training data includes storing the context data as a training data sample and an identification of the target stationary playback device as a label for the training data sample.

In a further embodiment again, updating the prediction model comprises passing the training data sample through the prediction model to generate probabilities for each stationary playback device of the several stationary playback devices, computing a loss based on the generated probabilities and the target stationary playback device, and updating weights of the prediction model based on the computed loss.

In still yet another embodiment, generating the training data further includes storing the predicted stationary playback device, wherein updating the prediction model comprises computing a loss based on the predicted stationary playback device and the target stationary playback device, and updating weights of the prediction model based on the computed loss.

In a still yet further embodiment, the context data further includes at least one of a time of day, day of the week, and a user identity.

One embodiment includes a method for training a prediction engine in a media playback system. The method includes steps for monitoring a media playback system that includes several playback devices, determining whether to capture training data, identifying a true user interaction, identifying a predicted user interaction from a prediction model, and generating training data based on the true user interaction and the predicted user interaction.

In still another additional embodiment, monitoring the system includes localizing a portable device within the media playback system to determine a probability matrix, wherein the probability matrix indicates likelihoods that the portable device is nearest to each of the several playback devices, wherein identifying the predicted user interaction includes feeding the probability matrix as an input to the prediction model.

In a still further additional embodiment, the method further includes steps for obtaining context data, wherein the context data includes a set of data from the group consisting of user data, system state data, and localization data.

In still another embodiment again, monitoring the media playback system includes localizing a portable device in the media playback system, and determining whether to capture training data includes determining whether a confidence level for the localizing of the portable device exceeds a threshold value.

One embodiment includes a portable device comprising one or more processors and data storage having stored therein instructions executable by the one or more processors to cause the portable device to perform a method. The method includes steps for receiving context data for the portable device, wherein the context data includes localization data that describes a location of the portable device, identifying a predicted stationary playback device from several stationary playback devices in a media playback system that is predicted based on the context data using a prediction model, and receiving input identifying a target stationary playback device from the several stationary playback devices. The method further includes steps for generating training data based on the predicted stationary playback device and the received input, and updating the prediction model based on the generated training data.

In a still further embodiment again, the method further includes steps for a touch-screen display configured to display a graphical user interface.

In yet another additional embodiment, the method further includes updating the graphical user interface displayed on the touch-screen display based on the predicted stationary playback device.

In a yet further additional embodiment, receiving input identifying the target stationary playback device includes receiving input identifying the target stationary playback device via the graphical user interface displayed on the touch-screen display.

Additional embodiments and features are set forth in part in the description that follows, and in part will become apparent to those skilled in the art upon examination of the specification or may be learned by the practice of the technology described herein. A further understanding of the nature and advantages of the technology described herein may be realized by reference to the remaining portions of the specification and the drawings, which forms a part of this disclosure.

BRIEF DESCRIPTION OF THE DRAWINGS

Features, aspects, and advantages of the presently disclosed technology may be better understood with regard to the following description, appended claims, and accompanying drawings.

FIG. 4A is a functional block diagram of an example controller device in accordance with aspects of the disclosure.

FIGS. 4B and 4C are controller interfaces in accordance with aspects of the disclosure.

FIG. 8 illustrates an example of a data structure for characteristics of signals in a networked sensor system in accordance with an embodiment.

Figure 1A:
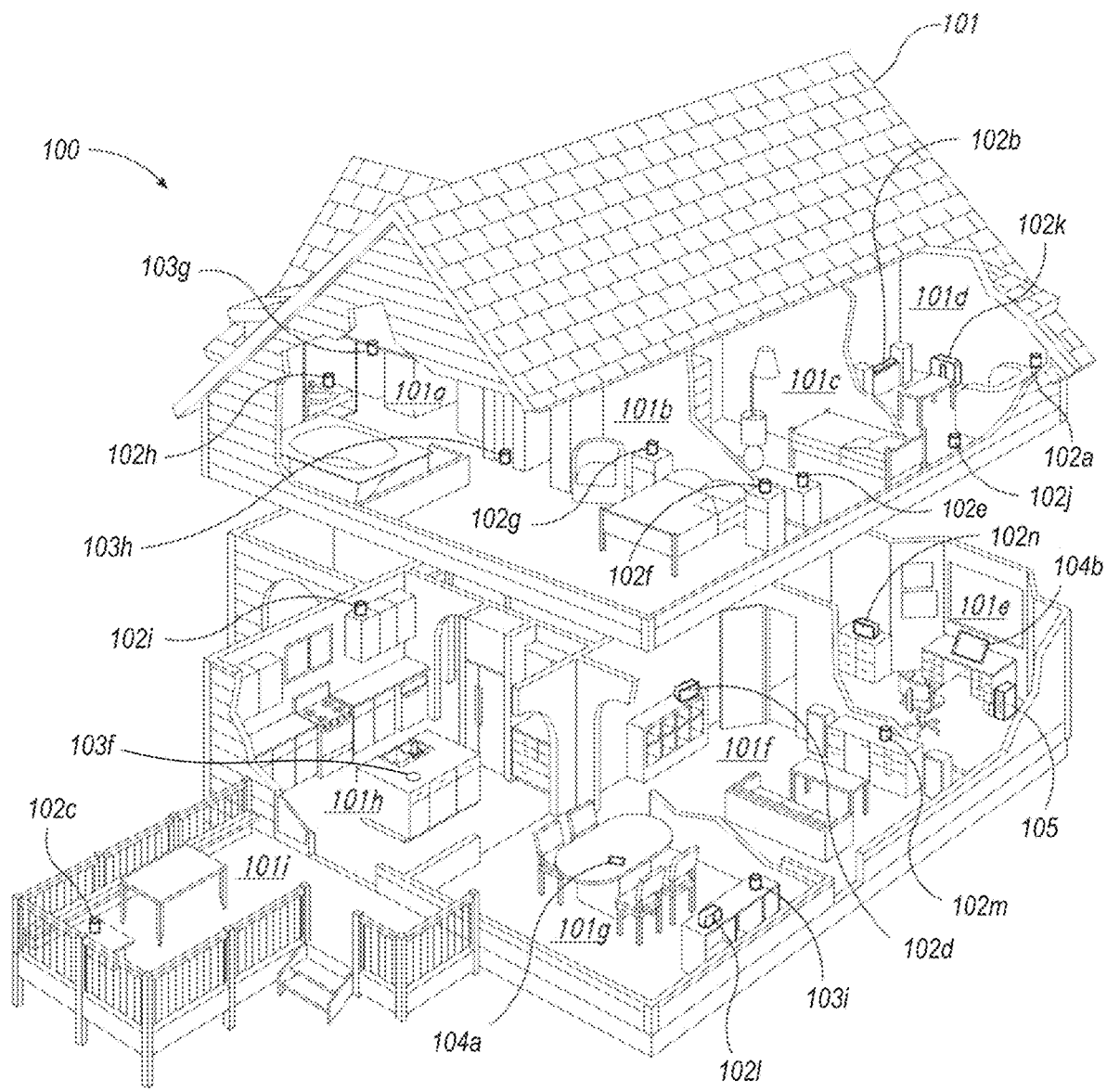
FIG. 1A is a partial cutaway view of an environment having a media playback system configured in accordance with aspects of the disclosed technology.

The drawings are for purposes of illustrating example embodiments, but it should be understood that these embodiments are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 103a is first introduced and discussed with reference to FIG. 1A.

DETAILED DESCRIPTION

I. Overview

As devices become smarter, it is becoming increasingly desirable to locate and interact with devices within indoor areas (e.g., a home). However, due to the variety of different floorplans and various interfering effects found indoors (e.g., walls, appliances, furniture, etc.), it can be difficult to locate a device in such an environment. While some conventional solutions have used wireless signals to locate a device based on signal strength of a wireless signal from a single known source (e.g., a BLUETOOTH beacon, WI-FI transmitter, etc.) detected by the device, such solutions can often be inaccurate or inconsistent, varying based on the transmitter/receiver hardware in the device and/or the BLUETOOTH beacon. For example, a first device may appear to be closer to the BLUETOOTH beacon than a second device because the first device detected a wireless signal transmitted by the BLUETOOTH beacon at a higher power level than the second device. However, the first device may simply employ a high gain antenna and, in fact, be significantly further away from the BLUETOOTH beacon than the second device. Further, some conventional systems require specific calibration for an environment, which can be difficult and tedious, particularly as the position of devices in the system change. In contrast to these conventional methods, some embodiments of the technology described herein may be employed to advantageously measure and normalize signals between a portable device and reference devices (e.g., speakers, NMDs, controllers, etc.) in a system (e.g., a media playback system (MPS)) to estimate, for each reference device, a likelihood that the portable device is located near the reference device. As a result, locations identified in accordance with the techniques described herein can be considerably more accurate, without the need for calibration or adjustments for different environments, relative to locations identified using conventional approaches.

In some cases, it can be desirable for the interaction of devices to be automated or streamlined based on the location of a portable device (e.g., a mobile phone). It can also be difficult to identify a desired target device to interact with based on the location of the portable device, not only because the location of the portable device can be difficult to determine, but also because the location of the portable device alone may not provide sufficient context to correctly predict the desired target device. For example, a user may always turn on the kitchen SONOS speakers first thing in the morning from their bedroom, even when they have a closer set of speakers in their bedroom, because they intend to go to the kitchen. Conventional solutions use simple rules-based heuristics based on manual programming by a user, but such solutions can be difficult to maintain and are often unable to adjust to a user's changing preferences. In contrast to these conventional methods, some embodiments of the technology described herein may be employed to advantageously generate training data based on a user's patterns in order to train a target device prediction model specific to a user (or household). Such processes can result in more accurate predictions with less manual user input. In particular, the processes may enable a system to identify repeated behaviors in user behavior and adapt to the identified user behavior to enhance subsequent user interactions with the system.

Although many of the examples described herein refer to MPSs, one skilled in the art will recognize that similar systems and methods can be used in a variety of different systems to locate, predict target devices, and/or train such a predictor, including (but not limited to) security systems, Internet of Things (IoT) systems, etc., without departing from the scope of the present disclosure. Further, the techniques described herein may be advantageously employed for device localization in any of a variety of operating environments including indoor environments, outdoor environments, and mixed indoor-outdoor environments.

While some embodiments described herein may refer to functions performed by given actors, such as "users" and/or other entities, it should be understood that this description is for purposes of explanation only. The claims should not be interpreted to require action by any such example actor unless explicitly required by the language of the claims themselves.

II. Example Operating Environment

Figure 1B:
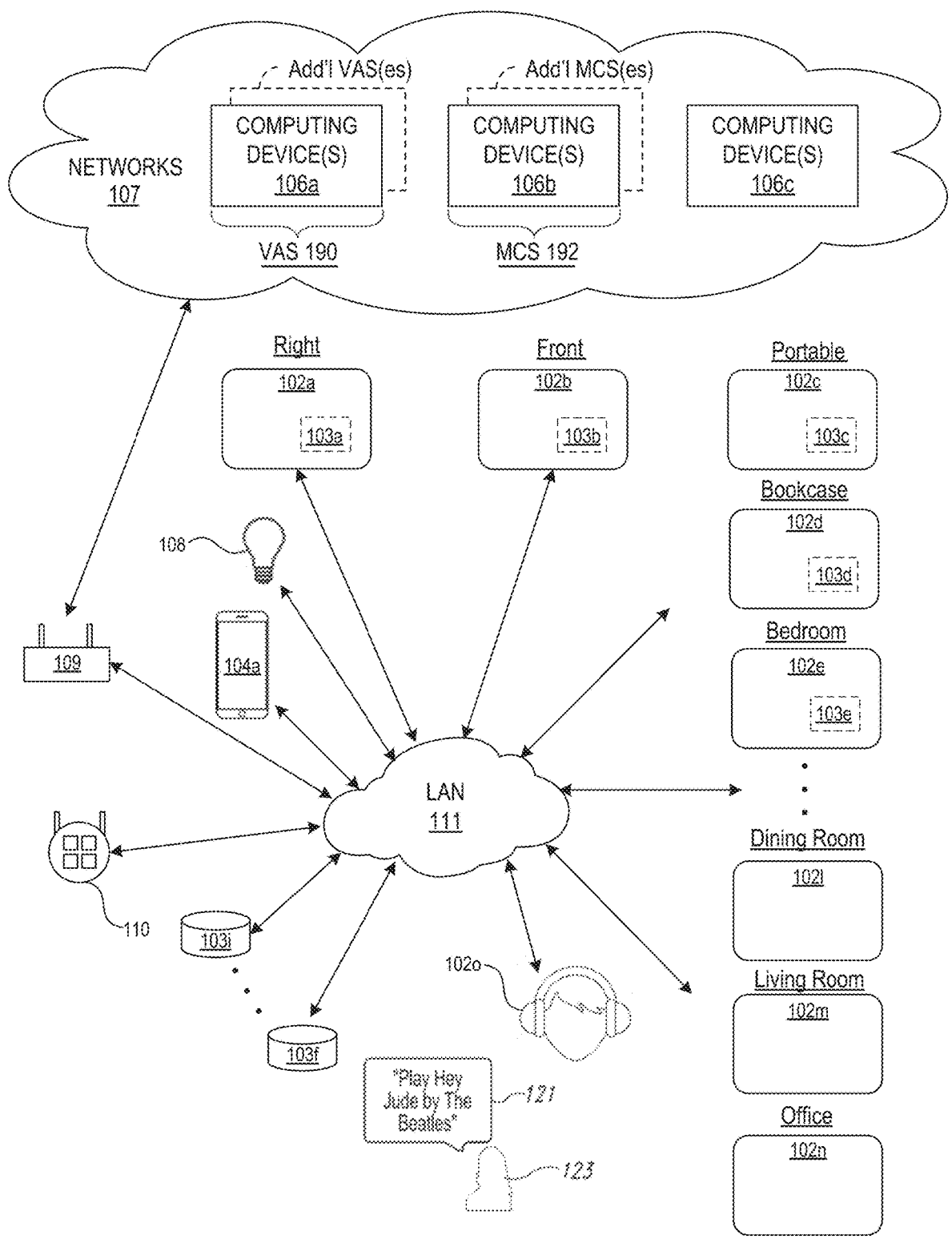
FIG. 1B is a schematic diagram of the media playback system of FIG. 1A and one or more networks.

FIGS. 1A and 1B illustrate an example configuration of a media playback system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101a, a master bedroom 101b (referred to herein as "Nick's Room"), a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102a-102o), network microphone devices 103 (identified individually as "NMDs" 103a-102i), and controller devices 104a and 104b (collectively "controller devices 104"). Referring to FIG. 1B, the home environment may include additional and/or other computing devices, including local network devices, such as one or more smart illumination devices 108 (FIG. 1B), a smart thermostat 110, and a local computing device 105 (FIG. 1A). In embodiments described below, one or more of the various playback devices 102 may be configured as portable playback devices, while others may be configured as stationary playback devices. For example, the headphones 102o (FIG. 1B) are a portable playback device, while the playback device 102d on the bookcase may be a stationary device. As another example, the playback device 102c on the Patio may be a battery-powered device, which may allow it to be transported to various areas within the environment 101, and outside of the environment 101, when it is not plugged in to a wall outlet or the like. Localization, prediction, and/or training of prediction models in accordance with a number of embodiments can be performed on such computing devices.

With reference still to FIG. 1B, the various playback, network microphone, and controller devices 102-104 and/or other network devices of the MPS 100 may be coupled to one another via point-to-point connections and/or over other connections, which may be wired and/or wireless, via a LAN 111 including a network router 109. For example, the playback device 102j in the Den 101d (FIG. 1A), which may be designated as the "Left" device, may have a point-to-point connection with the playback device 102a, which is also in the Den 101d and may be designated as the "Right" device. In a related embodiment, the Left playback device 102j may communicate with other network devices, such as the playback device 102b, which may be designated as the "Front" device, via a point-to-point connection and/or other connections via the LAN 111.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a voice activated system ("VAS") and at least one remote computing device associated with a media content service ("MCS"). For instance, in the illustrated example of FIG. 1B, remote computing devices 106a are associated with a VAS 190 and remote computing devices 106b are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106c configured to perform certain operations, such as remotely facilitating media playback functions, managing device and system status information, directing communications between the devices of the MPS 100 and one or multiple VASes and/or MCSes, among other operations. In one example, the remote computing devices 106c provide cloud servers for one or more SONOS Wireless HiFi Systems. Remote computing devices can be used for parts of localization, prediction, and/or training of prediction models in accordance with a number of embodiments.

In various implementations, one or more of the playback devices 102 may take the form of or include an on-board (e.g., integrated) network microphone device. For example, the playback devices 102a-e include or are otherwise equipped with corresponding NMDs 103a-e, respectively. A playback device that includes or is equipped with an NMD may be referred to herein interchangeably as a playback device or an NMD unless indicated otherwise in the description. In some cases, one or more of the NMDs 103 may be a stand-alone device. For example, the NMDs 103f and 103g may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 102d because it is physically situated on a bookcase. Similarly, the NMD 103f may be assigned the named "Island" because it is physically situated on an island countertop in the Kitchen 101h (FIG. 1A). Some playback devices may be assigned names according to a zone or room, such as the playback devices 102e, 102l, 102m, and 102n, which are named "Bedroom," "Dining Room," "Living Room," and "Office," respectively. Further, certain playback devices may have functionally descriptive names. For example, the playback devices 102a and 102b are assigned the names "Right" and "Front," respectively, because these two devices are configured to provide specific audio channels during media playback in the zone of the Den 101d (FIG. 1A). The playback device 102c in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over a network via the LAN 111 and the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106c of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the media playback system 100 may exchange data via communication paths as described herein and/or using a metadata exchange channel as described in U.S. Application Publication No. US-2017-0242653, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102d in the environment 101 (FIG. 1A) is in relatively close proximity to the NMD-equipped Living Room playback device 102m, and both devices 102d and 102m may at least sometimes detect the same sound. In such cases, this may require arbitration as to which device is ultimately responsible for providing detected-sound data to the remote VAS. Examples of arbitrating between NMDs may be found, for example, in previously referenced U.S. Application Publication No. US-2017-0242653.

In certain implementations, an NMD may be assigned to, or otherwise associated with, a designated or default playback device that may not include an NMD. For example, the Island NMD 103f in the Kitchen 101h (FIG. 1A) may be assigned to the Dining Room playback device 102l, which is in relatively close proximity to the Island NMD 103f. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. Application Publication No. US-2017-0242653.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the LAN 111 (FIG. 1B) may be eliminated and the single playback device 102 and/or the single NMD 103 may communicate directly with the remote computing devices 106a-d. In some embodiments, a telecommunication network (e.g., an LTE network, a 5G network, etc.) may communicate with the various playback, network microphone, and/or controller devices 102-104 independent of a LAN.

While specific implementations of MPS's have been described above with respect to FIGS. 1A and 1B, there are numerous configurations of MPS's, including, but not limited to, those that do not interact with remote services, systems that do not include controllers, and/or any other configuration as appropriate to the requirements of a given application.

a. Example Playback & Network Microphone Devices

Figure 2A:
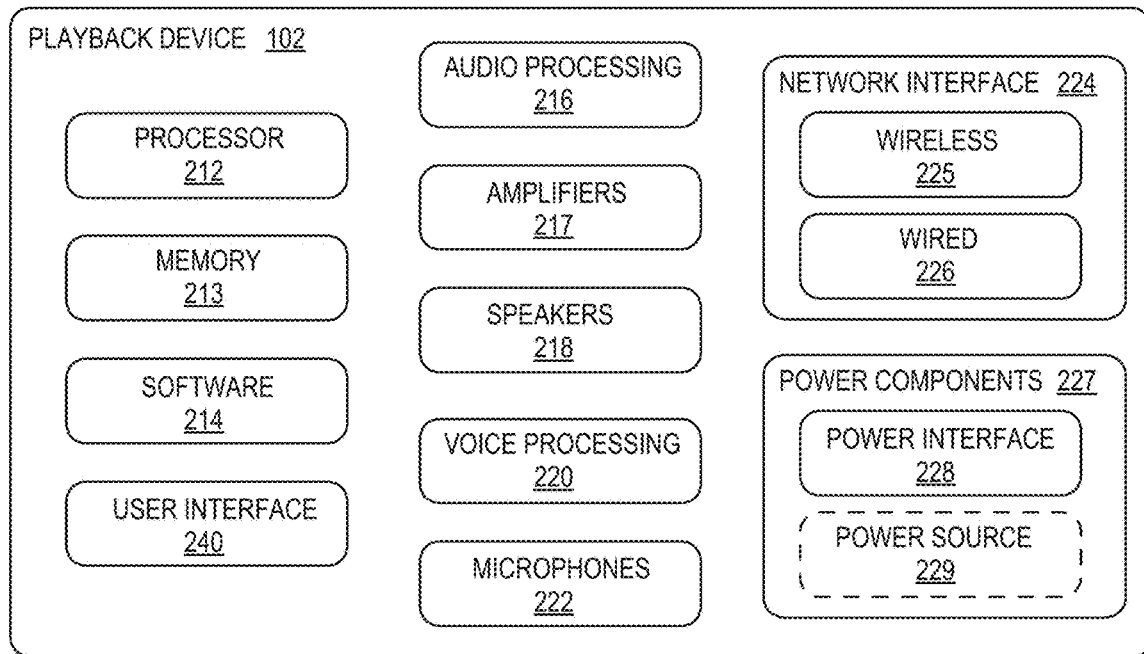
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions.

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled "System and method for synchronizing operations among a plurality of independently clocked digital data processing devices," which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain embodiments, a playback device may include neither the speakers 218 nor the audio amplifiers 217, but instead may include an audio interface (not shown) for connecting the playback device to an external audio amplifier or audio-visual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device(s)) in accordance with a communication protocol (e.g., any wireless standard including IEEE 802.11a, 802.11b, 802.11g, 802.11n, 802.11ac, 802.15, 4G mobile communication standard, and so on). A wired interface may provide network interface functions for the playback device 102 to communicate over a wired connection with other devices in accordance with a communication protocol (e.g., IEEE 802.3). While the network interface 224 shown in FIG. 2A includes both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

In some implementations, the voice-processing components 220 may detect and store a user's voice profile, which may be associated with a user account of the MPS 100. For example, voice profiles may be stored as and/or compared to variables stored in a set of command information or data table. The voice profile may include aspects of the tone or frequency of a user's voice and/or other unique aspects of the user's voice, such as those described in previously-referenced U.S. Application Publication No. US-2017-0242653.

As further shown in FIG. 2A, the playback device 102 also includes power components 227. The power components 227 can include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The playback device 102 can further include a user interface 240 that may facilitate user interactions independent of or in conjunction with user interactions facilitated by one or more of the controller devices 104. In various embodiments, the user interface 240 includes one or more physical buttons and/or supports graphical interfaces provided on touch sensitive screen(s) and/or surface(s), among other possibilities, for a user to directly provide input. The user interface 240 may further include one or more of lights (e.g., LEDs) and the speakers to provide visual and/or audio feedback to a user.

Figure 2B:
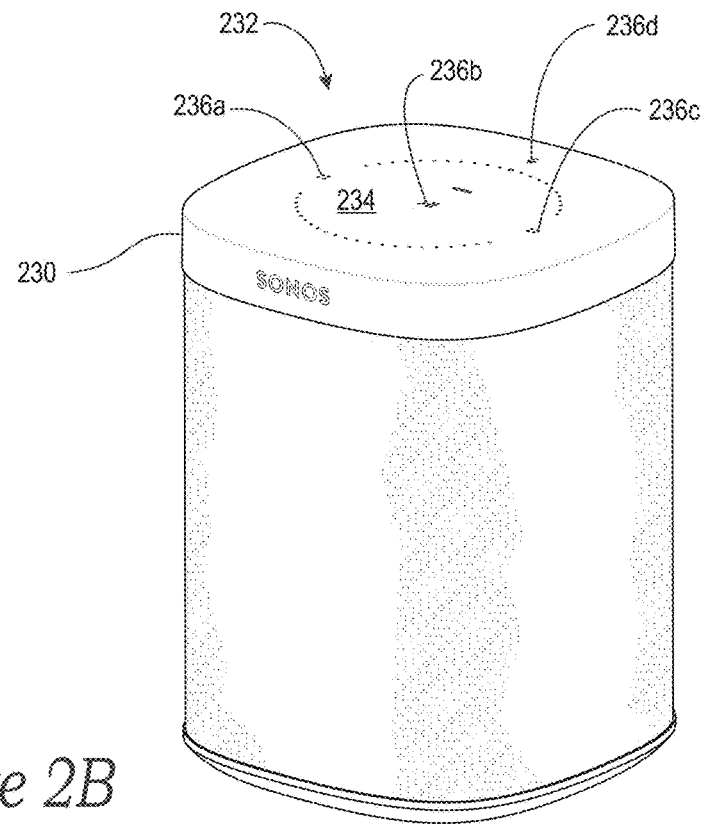
FIG. 2B is an isometric diagram of an example housing of the playback device of FIG. 2A.

As an illustrative example, FIG. 2B shows an example housing 230 of the playback device 102 that includes a user interface in the form of a control area 232 at a top portion 234 of the housing 230. The control area 232 includes buttons 236a-c for controlling audio playback, volume level, and other functions. The control area 232 also includes a button 236d for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

While specific implementations of playback and network microphone devices have been described above with respect to FIGS. 2A and 2B, there are numerous configurations of devices, including, but not limited to, those having no UI, microphones in different locations, multiple microphone arrays positioned in different arrangements, and/or any other configuration as appropriate to the requirements of a given application. For example, UIs and/or microphone arrays can be implemented in other playback devices and/or computing devices rather than those described herein. Further, although a specific example of playback device 102 is described with reference to MPS 100, one skilled in the art will recognize that playback devices as described herein can be used in a variety of different environments, including (but not limited to) environments with more and/or fewer elements, without departing from the scope of the present disclosure. Likewise, MPS's as described herein can be used with various different playback devices.

By way of illustration, SONOS, Inc. presently offers (or has offered) for sale certain playback devices that may implement certain of the embodiments disclosed herein, including a "PLAY:1," "PLAY:3," "PLAY:5," "PLAYBAR," "CONNECT:AMP," "PLAYBASE," "BEAM," "CONNECT," and "SUB." Any other past, present, and/or future playback devices may additionally or alternatively be used to implement the playback devices of example embodiments disclosed herein. Additionally, it should be understood that a playback device is not limited to the examples illustrated in FIG. 2A or 2B or to the SONOS product offerings. For example, a playback device may include, or otherwise take the form of, a wired or wireless headphone set, which may operate as a part of the media playback system 100 via a network interface or the like. In another example, a playback device may include or interact with a docking station for personal mobile media playback devices. In yet another example, a playback device may be integral to another device or component such as a television, a lighting fixture, or some other device for indoor or outdoor use.

b. Example Playback Device Configurations

Figure 3B:
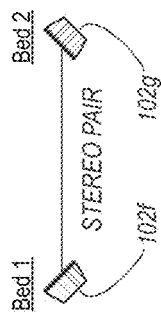
FIGS. 3A-3E are diagrams showing example playback device configurations in accordance with aspects of the disclosure.
Figure 3C:
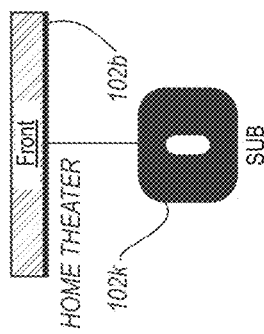
Figure 3D:
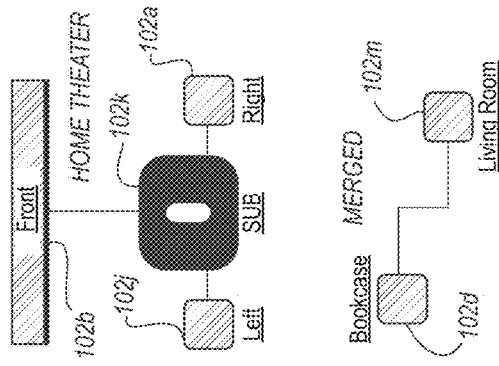
Figure 3E:
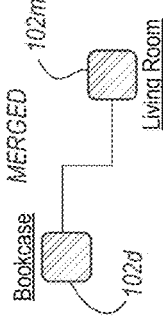
Figure 3A:
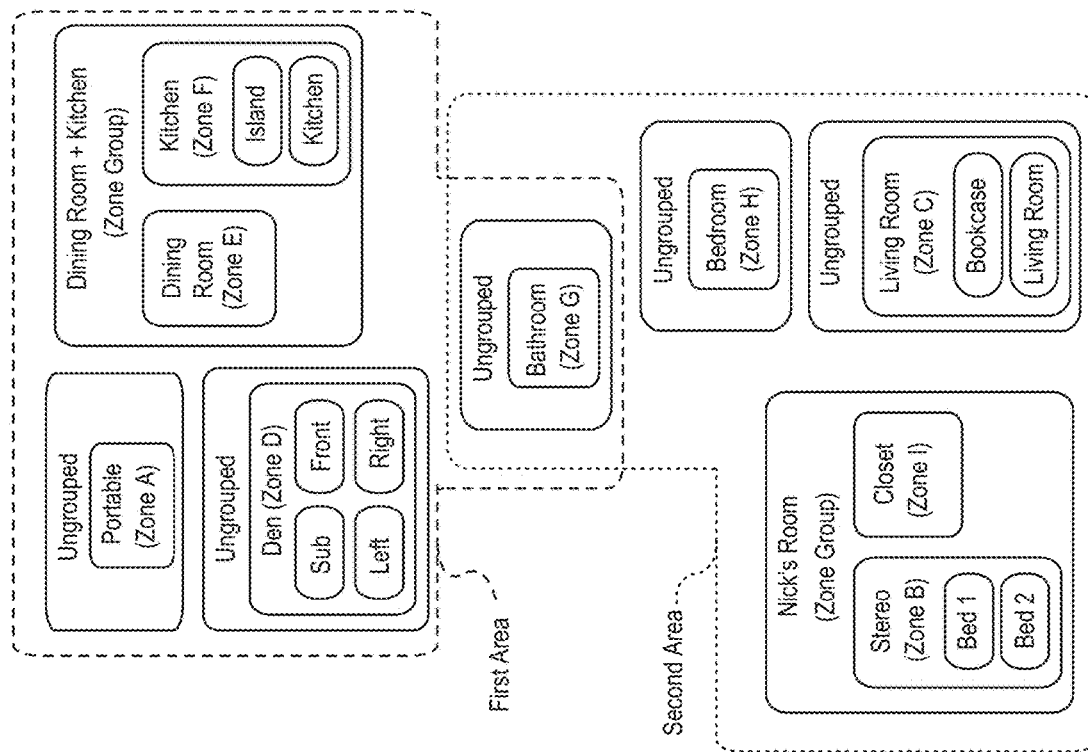

FIGS. 3A-3E show example configurations of playback devices. Referring first to FIG. 3A, in some example instances, a single playback device may belong to a zone. For example, the playback device 102c (FIG. 1A) on the Patio may belong to Zone A. In some implementations described below, multiple playback devices may be "bonded" to form a "bonded pair," which together form a single zone. For example, the playback device 102f (FIG. 1A) named "Bed 1" in FIG. 3A may be bonded to the playback device 102g (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102d named "Bookcase" may be merged with the playback device 102m named "Living Room" to form a single Zone C. The merged playback devices 102d and 102m may not be specifically assigned different playback responsibilities. That is, the merged playback devices 102d and 102m may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various embodiments, a zone may take on the name of one of the playback devices belonging to the zone. For example, Zone C may take on the name of the Living Room device 102m (as shown). In another example, Zone C may instead take on the name of the Bookcase device 102d. In a further example, Zone C may take on a name that is some combination of the Bookcase device 102d and Living Room device 102m. The name that is chosen may be selected by a user via inputs at a controller device 104. In some embodiments, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102f in the master bedroom 101h (FIG. 1A) and the Bed 2 device may be the playback device 102g also in the master bedroom 101h (FIG. 1A).

As noted above, playback devices that are bonded may have different playback responsibilities, such as playback responsibilities for certain audio channels. For example, as shown in FIG. 3B, the Bed 1 and Bed 2 devices 102f and 102g may be bonded so as to produce or enhance a stereo effect of audio content. In this example, the Bed 1 playback device 102f may be configured to play a left channel audio component, while the Bed 2 playback device 102g may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102b named "Front" may be bonded with the playback device 102k named "SUB." The Front device 102b may render a range of mid to high frequencies, and the SUB device 102k may render low frequencies as, for example, a subwoofer. When unbonded, the Front device 102b may be configured to render a full range of frequencies. As another example, FIG. 3D shows the Front and SUB devices 102b and 102k further bonded with Right and Left playback devices 102a and 102j, respectively. In some implementations, the Right and Left devices 102a and 102j may form surround or "satellite" channels of a home theater system. The bonded playback devices 102a, 102b, 102j, and 102k may form a single Zone D (FIG. 3A).

In some implementations, playback devices may also be "merged." In contrast to certain bonded playback devices, playback devices that are merged may not have assigned playback responsibilities, but may each render the full range of audio content that each respective playback device is capable of. Nevertheless, merged devices may be represented as a single UI entity (i.e., a zone, as discussed above). For instance, FIG. 3E shows the playback devices 102d and 102m in the Living Room merged, which would result in these devices being represented by the single UI entity of Zone C. In one embodiment, the playback devices 102d and 102*m* may playback audio in synchrony, during which each outputs the full range of audio content that each respective playback device 102*d* and 102*m* is capable of rendering.

In some embodiments, a stand-alone NMD may be in a zone by itself. For example, the NMD 103*h* from FIG. 1A is named "Closet" and forms Zone I in FIG. 3A. An NMD may also be bonded or merged with another device so as to form a zone. For example, the NMD device 103*f* named "Island" may be bonded with the playback device 102*i* Kitchen, which together form Zone F, which is also named "Kitchen." Additional details regarding assigning NMDs and playback devices as designated or default devices may be found, for example, in previously referenced U.S. Application Publication No. US-2017-0242653. In some embodiments, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Grouped and bonded devices are example types of associations between portable and stationary playback devices that may be caused in response to a trigger event, as discussed above and described in greater detail below.

In various implementations, the zones in an environment may be assigned a particular name, which may be the default name of a zone within a zone group or a combination of the names of the zones within a zone group, such as "Dining Room+Kitchen," as shown in FIG. 3A. In some embodiments, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the media playback system 100, which may be shared from time to time among the devices so that one or more of the devices have the most recent data associated with the system.

In some embodiments, the memory 213 of the playback device 102 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102*a*, 102*b*, 102*j*, and 102*k*. Identifiers associated with the Dining Room may indicate that the Dining Room is part of Dining Room+Kitchen group and that devices 103*f* and 102*i* are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

The memory 213 may be further configured to store other data. Such data may pertain to audio sources accessible by the playback device 102 or a playback queue that the playback device (or some other playback device(s)) may be associated with. In embodiments described below, the memory 213 is configured to store a set of command data for selecting a particular VAS when processing voice inputs.

During operation, one or more playback zones in the environment of FIG. 1A may each be playing different audio content. For instance, the user may be grilling in the Patio zone and listening to hip hop music being played by the playback device 102*c*, while another user may be preparing food in the Kitchen zone and listening to classical music being played by the playback device 102*i*. In another example, a playback zone may play the same audio content in synchrony with another playback zone. For instance, the user may be in the Office zone where the playback device 102*n* is playing the same hip-hop music that is being playing by playback device 102*c* in the Patio zone. In such a case, playback devices 102*c* and 102*n* may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102c from the Patio zone to the Office zone, the Office zone may now include both the playback devices 102c and 102n. In some cases, the user may pair or group the moved playback device 102c with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102i and 102l may render audio content in synchrony. As another example, bonded playback devices in the Den zone may be split into (i) a television zone and (ii) a separate listening zone. The television zone may include the Front playback device 102b. The listening zone may include the Right, Left, and SUB playback devices 102a, 102j, and 102k, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103a or 103b (FIG. 1B) to control the Den zone before it is separated into the television zone and the listening zone. Once separated, the listening zone may be controlled, for example, by a user in the vicinity of the NMD 103a, and the television zone may be controlled, for example, by a user in the vicinity of the NMD 103b. As described above, however, any of the NMDs 103 may be configured to control the various playback and other devices of the MPS 100.

c. Example Controller Devices

FIG. 4A is a functional block diagram illustrating certain aspects of a selected one of the controller devices 104 of the MPS 100 of FIG. 1A. Controller devices in accordance with several embodiments can be used in various systems, such as (but not limited to) an MPS as described in FIG. 1A. Such controller devices may also be referred to herein as a "control device" or "controller." The controller device shown in FIG. 4A may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™).

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 can be configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

As shown in FIG. 4A, the controller device 104 can also include a user interface 440 that is generally configured to facilitate user access and control of the MPS 100. The user interface 440 may include a touch-screen display or other physical interface configured to provide various graphical controller interfaces, such as the controller interfaces 440a and 440b shown in FIGS. 4B and 4C. Referring to FIGS. 4B and 4C together, the controller interfaces 440a and 440b include a playback control region 442, a playback zone region 443, a playback status region 444, a playback queue region 446, and a sources region 448. The user interface as shown is just one example of an interface that may be provided on a network device, such as the controller device shown in FIG. 4A, and accessed by users to control a media playback system, such as the MPS 100. Other user interfaces of varying formats, styles, and interactive sequences may alternatively be implemented on one or more network devices to provide comparable control access to a media playback system.

The playback control region 442 (FIG. 4B) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 442 may also include selectable icons that, when selected, modify equalization settings and/or playback volume, among other possibilities.

The playback zone region 443 (FIG. 4C) may include representations of playback zones within the MPS 100. The playback zones regions 443 may also include a representation of zone groups, such as the Dining Room+Kitchen zone group, as shown. In some embodiments, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 443 (FIG. 4C) may be dynamically updated as playback zone or zone group configurations are modified.

The playback status region 444 (FIG. 4B) may include graphical representations of audio content that is presently being played, previously played, or scheduled to play next in the selected playback zone or zone group. The selected playback zone or zone group may be visually distinguished on a controller interface, such as within the playback zone region 443 and/or the playback status region 444. The graphical representations may include track title, artist name, album name, album year, track length, and/or other relevant information that may be useful for the user to know when controlling the MPS 100 via a controller interface.

The playback queue region 446 may include graphical representations of audio content in a playback queue associated with the selected playback zone or zone group. In some embodiments, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 4B and 4C, the graphical representations of audio content in the playback queue region 446 (FIG. 4B) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 448 may include graphical representations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some embodiments, a user may assign a VAS exclusively to one or more NMDs. For example, a user may assign a first VAS to one or both of the NMDs 102a and 102b in the Living Room shown in FIG. 1A, and a second VAS to the NMD 103f in the Kitchen. Other examples are possible.

d. Example Audio Content Sources

The audio sources in the sources region 448 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some embodiments audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some embodiments, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

e. Example Network Microphone Devices

Figure 5:
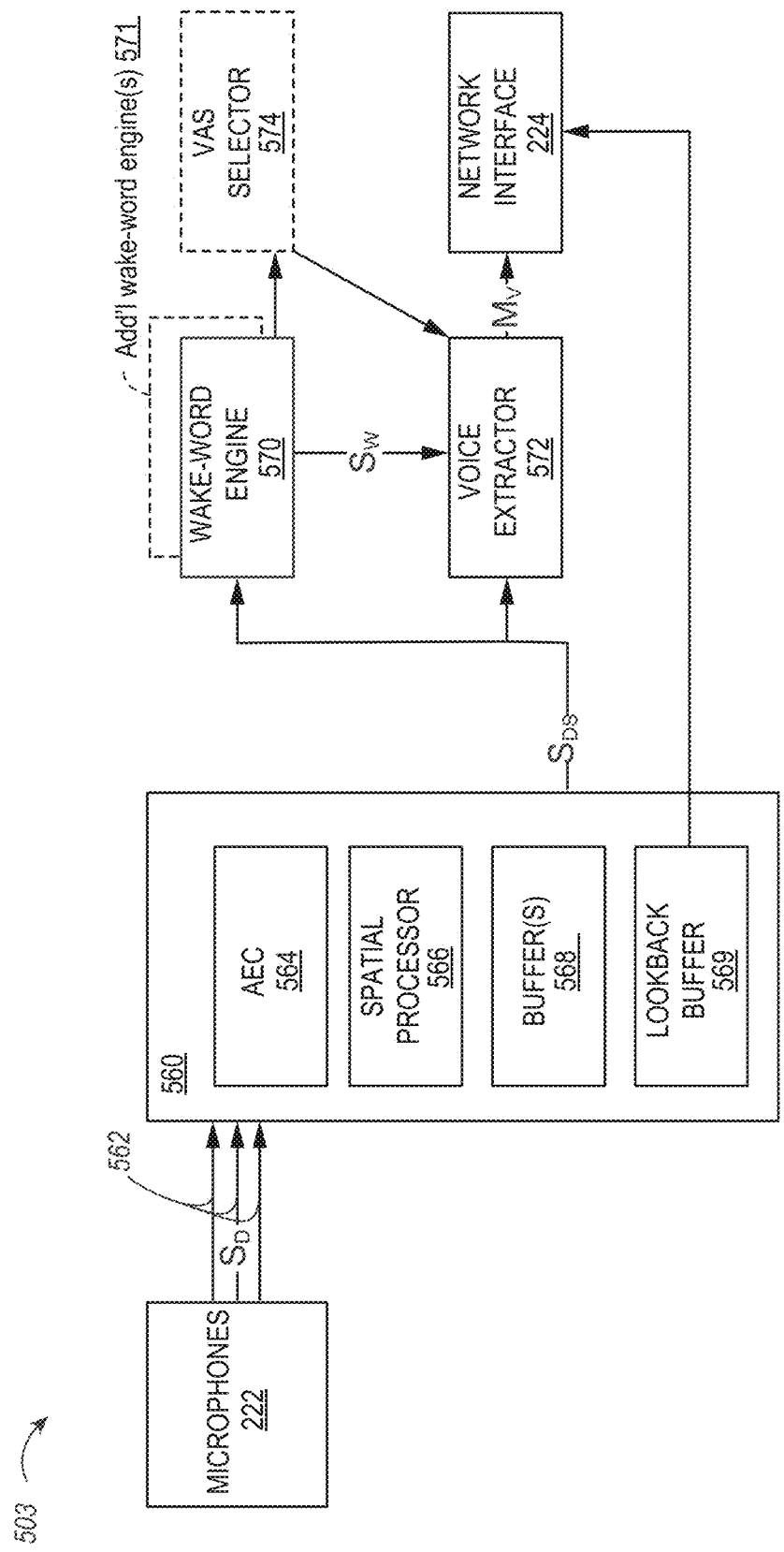
FIG. 5 is a functional block diagram of certain components of an example network microphone device in accordance with aspects of the disclosure.

FIG. 5 is a functional block diagram showing an NMD 503 configured in accordance with embodiments of the disclosure. The NMD 503 includes voice capture components ("VCC", or collectively "voice processor 560"), a wake-word engine 570, and at least one voice extractor 572, each of which can be operably coupled to the voice processor 560. The NMD 503 further includes the microphones 222 and the at least one network interface 224 described above and may also include other components, such as audio amplifiers, interface, etc., which are not shown in FIG. 5 for purposes of clarity.

The microphones 222 of the NMD 503 can be configured to provide detected sound, $S_D$, from the environment of the NMD 503 to the voice processor 560. The detected sound $S_D$ may take the form of one or more analog or digital signals. In example implementations, the detected sound $S_D$ may be composed of a plurality of signals associated with respective channels 562 that are fed to the voice processor 560.

Each channel 562 may correspond to a particular microphone 222. For example, an NMD having six microphones may have six corresponding channels. Each channel of the detected sound $S_D$ may bear certain similarities to the other channels but may differ in certain regards, which may be due to the position of the given channel's corresponding microphone relative to the microphones of other channels. For example, one or more of the channels of the detected sound $S_D$ may have a greater signal to noise ratio ("SNR") of speech to background noise than other channels.

As further shown in FIG. 5, the voice processor 560 includes an AEC 564, a spatial processor 566, and one or more buffers 568. In operation, the AEC 564 receives the detected sound $S_D$ and filters or otherwise processes the sound to suppress echoes and/or to otherwise improve the quality of the detected sound $S_D$. That processed sound may then be passed to the spatial processor 566.

The spatial processor 566 is typically configured to analyze the detected sound $S_D$ and identify certain characteristics, such as a sound's amplitude (e.g., decibel level), frequency spectrum, directionality, etc. In one respect, the spatial processor 566 may help filter or suppress ambient noise in the detected sound $S_D$ from potential user speech based on similarities and differences in the constituent channels 562 of the detected sound $S_D$, as discussed above. As one possibility, the spatial processor 566 may monitor metrics that distinguish speech from other sounds. Such metrics can include, for example, energy within the speech band relative to background noise and entropy within the speech band—a measure of spectral structure—which is typically lower in speech than in most common background noise. In some implementations, the spatial processor 566 may be configured to determine a speech presence probability, examples of such functionality are disclosed in U.S. patent application Ser. No. 15/984,073, filed May 18, 2018, titled "Linear Filtering for Noise-Suppressed Speech Detection," and U.S. patent application Ser. No. 16/147,710, filed Sep. 29, 2018, and titled "Linear Filtering for Noise-Suppressed Speech Detection via Multiple Network Microphone Devices," each of which is incorporated herein by reference in its entirety.

The wake-word engine 570 can be configured to monitor and analyze received audio to determine if any wake words are present in the audio. The wake-word engine 570 may analyze the received audio using a wake word detection algorithm. If the wake-word engine 570 detects a wake word, a network microphone device may process voice input contained in the received audio. Example wake word detection algorithms accept audio as input and provide an indication of whether a wake word is present in the audio. Many first- and third-party wake word detection processes are known and commercially available. For instance, operators of a voice service may make their processes available for use in third-party devices. Alternatively, a process may be trained to detect certain wake-words.

In some embodiments, the wake-word engine 570 runs multiple wake word detection processes on the received audio simultaneously (or substantially simultaneously). As noted above, different voice services (e.g. AMAZON's Alexa®, APPLE's Siri®, MICROSOFT's Cortana®, GOOGLE'S Assistant, etc.) each use a different wake word for invoking their respective voice service. To support multiple services, the wake-word engine 570 may run the received audio through the wake word detection process for each supported voice service in parallel. In such embodiments, the network microphone device 103 may include VAS selector components 574 configured to pass voice input to the appropriate voice assistant service. In other embodiments, the VAS selector components 574 may be omitted. In some embodiments, individual NMDs 103 of the MPS 100 may be configured to run different wake word detection processes associated with particular VASes. For example, the NMDs of playback devices 102*a* and 102*b* of the Living Room may be associated with AMAZON's ALEXA®, and be configured to run a corresponding wake word detection process (e.g., configured to detect the wake word "Alexa" or other associated wake word), while the NMD of playback device 102*f* in the Kitchen may be associated with GOOGLE's Assistant, and be configured to run a corresponding wake word detection process (e.g., configured to detect the wake word "OK, Google" or other associated wake word).

In some embodiments, a network microphone device may include speech processing components configured to further facilitate voice processing, such as by performing voice recognition trained to recognize a particular user or a particular set of users associated with a household. Voice recognition software may implement processes that are tuned to specific voice profile(s).

In operation, the one or more buffers 568—one or more of which may be part of or separate from the memory 213 (FIG. 2A)—capture data corresponding to the detected sound $S_D$. More specifically, the one or more buffers 568 capture detected-sound data that was processed by the upstream AEC 564 and spatial processor 566.

In general, the detected-sound data form a digital representation (i.e., sound-data stream), $S_{DS}$, of the sound detected by the microphones 222. In practice, the sound-data stream $S_{DS}$ may take a variety of forms. As one possibility, the sound-data stream $S_{DS}$ may be composed of frames, each of which may include one or more sound samples. The frames may be streamed (i.e., read out) from the one or more buffers 568 for further processing by downstream components, such as the wake-word engine 570 and the voice extractor 572 of the NMD 503.

In some implementations, at least one buffer 568 captures detected-sound data utilizing a sliding window approach in which a given amount (i.e., a given window) of the most recently captured detected-sound data is retained in the at least one buffer 568 while older detected-sound data are overwritten when they fall outside of the window. For example, at least one buffer 568 may temporarily retain 20 frames of a sound specimen at given time, discard the oldest frame after an expiration time, and then capture a new frame, which is added to the 19 prior frames of the sound specimen.

In practice, when the sound-data stream $S_{DS}$ is composed of frames, the frames may take a variety of forms having a variety of characteristics. As one possibility, the frames may take the form of audio frames that have a certain resolution (e.g., 16 bits of resolution), which may be based on a sampling rate (e.g., 44,100 Hz). Additionally, or alternatively, the frames may include information corresponding to a given sound specimen that the frames define, such as metadata that indicates frequency response, power input level, signal-to-noise ratio, microphone channel identification, and/or other information of the given sound specimen, among other examples. Thus, in some embodiments, a frame may include a portion of sound (e.g., one or more samples of a given sound specimen) and metadata regarding the portion of sound. In other embodiments, a frame may only include a portion of sound (e.g., one or more samples of a given sound specimen) or metadata regarding a portion of sound.

The voice processor 560 can also include at least one lookback buffer 569, which may be part of or separate from the memory 213 (FIG. 2A). In operation, the lookback buffer 569 can store sound metadata that is processed based on the detected-sound data $S_D$ received from the microphones 222. As noted above, the microphones 224 can include a plurality of microphones arranged in an array. The sound metadata can include, for example: (1) frequency response data for individual microphones of the array, (2) an echo return loss enhancement measure (i.e., a measure of the effectiveness of the acoustic echo canceller (AEC) for each microphone), (3) a voice direction measure; (4) arbitration statistics (e.g., signal and noise estimates for the spatial processing streams associated with different microphones); and/or (5) speech spectral data (i.e., frequency response evaluated on processed audio output after acoustic echo cancellation and spatial processing have been performed). Other sound metadata may also be used to identify and/or classify noise in the detected-sound data $S_D$. In at least some embodiments, the sound metadata may be transmitted separately from the sound-data stream $S_{DS}$, as reflected in the arrow extending from the lookback buffer 569 to the network interface 224. For example, the sound metadata may be transmitted from the lookback buffer 569 to one or more remote computing devices separate from the VAS which receives the sound-data stream $S_{DS}$. In some embodiments, for example, the metadata can be transmitted to a remote service provider for analysis to construct or modify a noise classifier, as described in more detail below.

In any case, components of the NMD 503 downstream of the voice processor 560 may process the sound-data stream $S_{DS}$. For instance, the wake-word engine 570 can be configured to apply one or more identification processes to the sound-data stream $S_{DS}$ (e.g., streamed sound frames) to spot potential wake words in the detected-sound $S_D$. When the wake-word engine 570 spots a potential wake word, the wake-word engine 570 can provide an indication of a "wake-word event" (also referred to as a "wake-word trigger") to the voice extractor 572 in the form of signal $S_W$.

In response to the wake-word event (e.g., in response to a signal $S_W$ from the wake-word engine 570 indicating the wake-word event), the voice extractor 572 can be configured to receive and format (e.g., packetize) the sound-data stream $S_{DS}$. For instance, the voice extractor 572 packetizes the frames of the sound-data stream $S_{DS}$ into messages. The voice extractor 572 can transmit or stream these messages, $M_V$, that may contain voice input in real time or near real time, to a remote VAS, such as the VAS 190 (FIG. 1B), via the network interface 218.

Figures 6A, 6B:
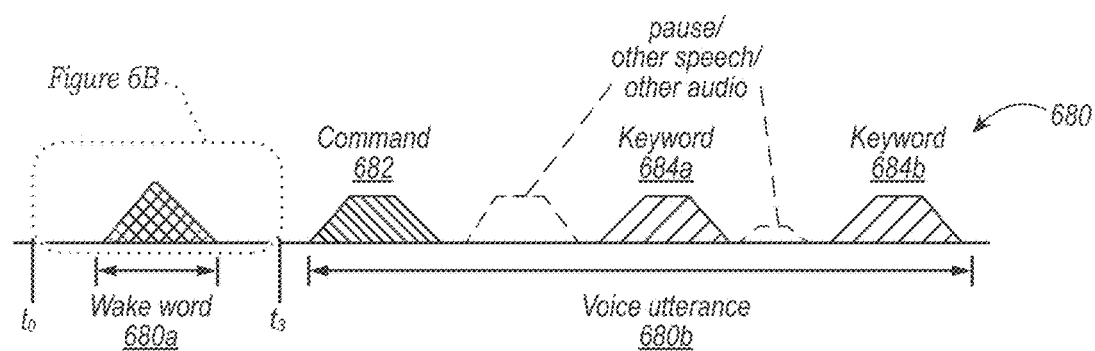
FIG. 6A is a diagram of an example voice input.
FIG. 6B is a graph depicting an example sound specimen in accordance with aspects of the disclosure.

The VAS can be configured to process the sound-data stream $S_{DS}$ contained in the messages $M_V$ sent from the NMD 503. More specifically, the VAS can be configured to identify voice input based on the sound-data stream $S_{DS}$. Referring to FIG. 6A, a voice input 680 may include a wake-word portion 680a and an utterance portion 680b. The wake-word portion 680a can correspond to detected sound that caused the wake-word event. For instance, the wake-word portion 680a can correspond to detected sound that caused the wake-word engine 570 to provide an indication of a wake-word event to the voice extractor 572. The utterance portion 680b can correspond to detected sound that potentially comprises a user request following the wake-word portion 680a.

As an illustrative example, FIG. 6B shows an example first sound specimen. In this example, the sound specimen corresponds to the sound-data stream $S_{DS}$ (e.g., one or more audio frames) associated with the spotted wake word 680a of FIG. 6A. As illustrated, the example first sound specimen comprises sound detected in the playback device 102i's environment (i) immediately before a wake word was spoken, which may be referred to as a pre-roll portion (between times $t_0$ and $t_1$), (ii) while the wake word was spoken, which may be referred to as a wake-meter portion (between times $t_1$ and $t_2$), and/or (iii) after the wake word was spoken, which may be referred to as a post-roll portion (between times $t_2$ and $t_3$). Other sound specimens are also possible.

Typically, the VAS may first process the wake-word portion 680a within the sound-data stream $S_{DS}$ to verify the presence of the wake word. In some instances, the VAS may determine that the wake-word portion 680a comprises a false wake word (e.g., the word "Election" when the word "Alexa" is the target wake word). In such an occurrence, the VAS may send a response to the NMD 503 (FIG. 5) with an indication for the NMD 503 to cease extraction of sound data, which may cause the voice extractor 572 to cease further streaming of the detected-sound data to the VAS. The wake-word engine 570 may resume or continue monitoring sound specimens until another potential wake word, leading to another wake-word event. In some implementations, the VAS may not process or receive the wake-word portion 680a but instead processes only the utterance portion 680b.

In any case, the VAS processes the utterance portion 680b to identify the presence of any words in the detected-sound data and to determine an underlying intent from these words.

The words may correspond to a certain command and certain keywords 684 (identified individually in FIG. 6A as a first keyword 684a and a second keyword 684b). A keyword may be, for example, a word in the voice input 680 identifying a particular device or group in the MPS 100. For instance, in the illustrated example, the keywords 684 may be one or more words identifying one or more zones in which the music is to be played, such as the Living Room and the Dining Room (FIG. 1A).

To determine the intent of the words, the VAS is typically in communication with one or more databases associated with the VAS (not shown) and/or one or more databases (not shown) of the MPS 100. Such databases may store various user data, analytics, catalogs, and other information for natural language processing and/or other processing. In some implementations, such databases may be updated for adaptive learning and feedback for a neural network based on voice-input processing. In some cases, the utterance portion 680b may include additional information, such as detected pauses (e.g., periods of non-speech) between words spoken by a user, as shown in FIG. 6A. The pauses may demarcate the locations of separate commands, keywords, or other information spoke by the user within the utterance portion 680b.

Based on certain command criteria, the VAS may take actions as a result of identifying one or more commands in the voice input, such as the command 682. Command criteria may be based on the inclusion of certain keywords within the voice input, among other possibilities. Additionally, or alternatively, command criteria for commands may involve identification of one or more control-state and/or zone-state variables in conjunction with identification of one or more particular commands. Control-state variables may include, for example, indicators identifying a level of volume, a queue associated with one or more devices, and playback state, such as whether devices are playing a queue, paused, etc. Zone-state variables may include, for example, indicators identifying which, if any, zone players are grouped.

After processing the voice input, the VAS may send a response to the MPS 100 with an instruction to perform one or more actions based on an intent it determined from the voice input. For example, based on the voice input, the VAS may direct the MPS 100 to initiate playback on one or more of the playback devices 102, control one or more of these devices (e.g., raise/lower volume, group/ungroup devices, etc.), turn on/off certain smart devices, among other actions. After receiving the response from the VAS, the wake-word engine 570 the NMD 503 may resume or continue to monitor the sound-data stream $S_{DS}$ until it spots another potential wake-word, as discussed above.

Referring back to FIG. 5, in multi-VAS implementations, the NMD 503 may include a VAS selector 574 (shown in dashed lines) that is generally configured to direct the voice extractor's extraction and transmission of the sound-data stream $S_{DS}$ to the appropriate VAS when a given wake-word is identified by a particular wake-word engine, such as the first wake-word engine 570a, the second wake-word engine 570b, or the additional wake-word engine 571. In such implementations, the NMD 503 may include multiple, different wake-word engines and/or voice extractors, each supported by a particular VAS. Similar to the discussion above, each wake-word engine may be configured to receive as input the sound-data stream $S_{DS}$ from the one or more buffers 568 and apply identification algorithms to cause a wake-word trigger for the appropriate VAS. Thus, as one example, the first wake-word engine 570a may be configured to identify the wake word "Alexa" and cause the NMD 503 to invoke the AMAZON VAS when "Alexa" is spotted. As another example, the second wake-word engine 570b may be configured to identify the wake word "Ok, Google" and cause the NMD 503 to invoke the GOOGLE VAS when "Ok, Google" is spotted. In single-VAS implementations, the VAS selector 574 may be omitted.

In additional or alternative implementations, the NMD 503 may include other voice-input identification engines 571 (shown in dashed lines) that enable the NMD 503 to operate without the assistance of a remote VAS. As an example, such an engine may identify in detected sound certain commands (e.g., "play," "pause," "turn on," etc.) and/or certain keywords or phrases, such as the unique name assigned to a given playback device (e.g., "Bookcase," "Patio," "Office," etc.). In response to identifying one or more of these commands, keywords, and/or phrases, the NMD 503 may communicate a signal (not shown in FIG. 5) that causes the audio processing components 216 (FIG. 2A) to perform one or more actions. For instance, when a user says "Hey Sonos, stop the music in the office," the NMD 503 may communicate a signal to the office playback device 102n, either directly, or indirectly via one or more other devices of the MPS 100, which causes the office device 102n to stop audio playback. Reducing or eliminating the need for assistance from a remote VAS may reduce latency that might otherwise occur when processing voice input remotely. In some cases, the identification algorithms employed may be configured to identify commands that are spoken without a preceding wake word. For instance, in the example above, the NMD 503 may employ an identification algorithm that triggers an event to stop the music in the office without the user first saying "Hey Sonos" or another wake word.

III. Localizing a Portable Device

Systems and methods in accordance with numerous embodiments can be used to localize portable devices in networked device systems. Unlike other location technologies, processes in accordance with some embodiments can maintain control over both the roaming device (i.e., the portable device that is being moved around) and the reference devices (e.g., stationary playback devices, controllers, etc.). As a result, a greater level of control over the devices within the device ecosystem can be leveraged to determine a relative location for a portable device with a high degree of accuracy in challenging environments (e.g., indoor environments with all types of obstructions).

In certain embodiments, localizing a portable device can be performed at the portable device that is being located and/or at reference devices (e.g., a coordinator device) in an MPS. Localization processes in accordance with several embodiments can be distributed across multiple devices (e.g., portable devices, stationary devices, remote devices, etc.). In several embodiments, a coordinator device is designated to collect and store signal information from reference devices and/or from the portable device. Coordinator devices in accordance with numerous embodiments can be selected from the available devices of an MPS based on one or more of several factors, including (but not limited to) RSSI of signals received from the portable device at the reference devices, frequency of use, device specifications (e.g., number of processor cores, processor clock speed, processor cache size, non-volatile memory size, volatile memory size, etc.). For example, a particular player can be selected as a coordinator device based on how long the processor has been idle, so as not to interfere with the operation of any other devices during playback (e.g., selecting a speaker sitting in a guest bedroom that is used infrequently). In certain embodiments, coordinator devices can include the portable device that is being located.

In a number of embodiments, localizing a portable device (e.g., a portable playback device, a smartphone, a tablet, etc.) can be used to identify a relative location for the portable device based on a number of reference devices in an MPS. Reference devices in accordance with a number of embodiments can include stationary devices and/or portable devices. As the localizing of a portable device is not an absolute location, but rather a location relative to the locations of other reference devices, processes in accordance with many embodiments can be used to determine a nearest device, even when one or more of the reference devices is also portable.

Figure 7:
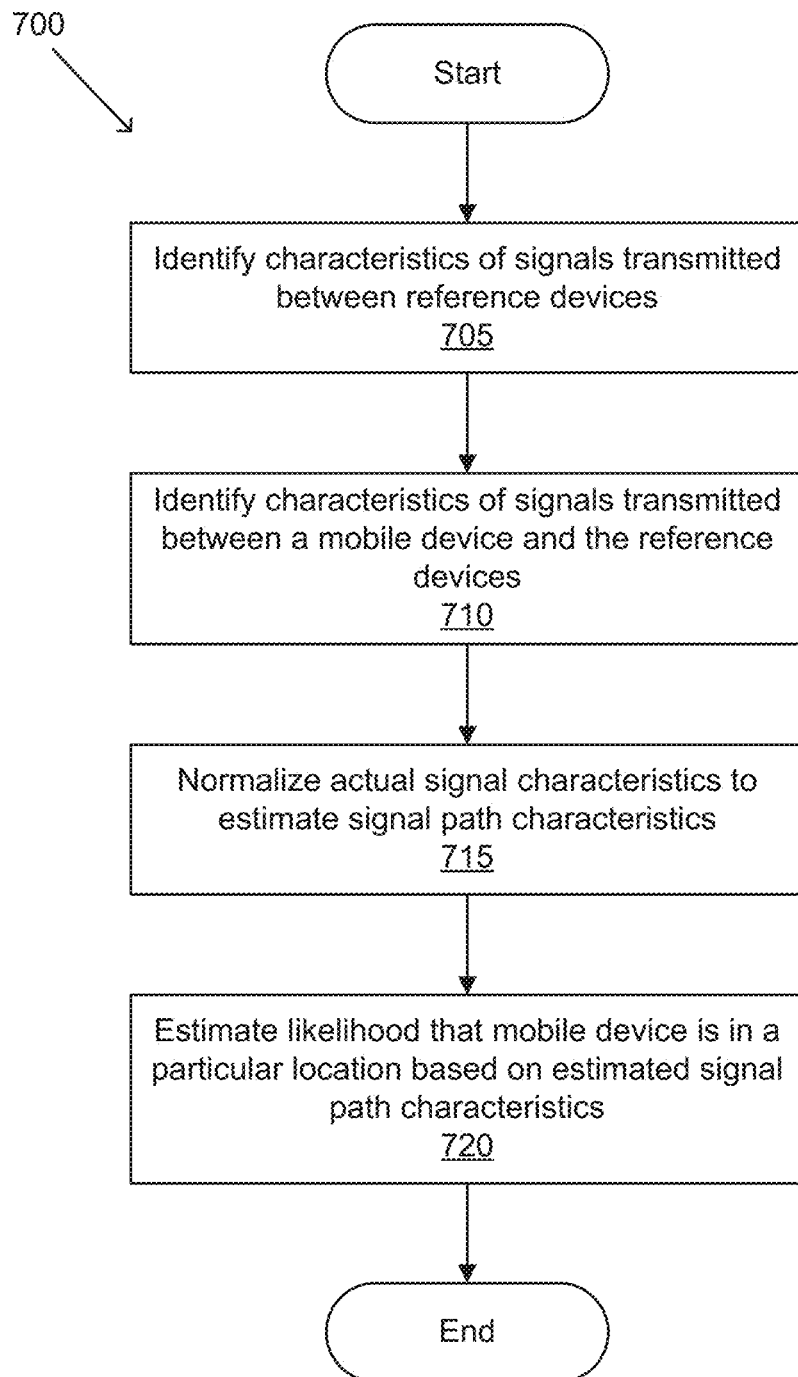
FIG. 7 conceptually illustrates an example of a process for localizing a portable device in a networked sensor system in accordance with an embodiment.

An example of a process for localizing a portable device in a networked sensor system in accordance with an embodiment is conceptually illustrated in FIG. 7. Process 700 identifies (705) characteristics of signals transmitted between reference devices. Process 700 also identifies (710) characteristics of signals transmitted between a portable device and the reference devices.

In certain embodiments, signals are transmitted when each reference device (e.g., network players, NMDs, etc.) and/or portable device performs a wireless (e.g., WI-FI) scan. Wireless scans in accordance with numerous embodiments can include broadcasting a first wireless signal that causes other wireless devices to respond with a second signal. In a number of embodiments, wireless radios in each device can provide, as a result of a wireless scan, signal information, which can include (but is not limited to) an indication of which devices responded, an indication of how long ago the scan was performed/how long ago a device responded, and/or received signal strength indicator (RSSI) values associated with the response from a particular device. Signal information in accordance with certain embodiments is gathered in pairs between all of the devices.

Processes in accordance with certain embodiments can scan periodically, allowing the devices to maintain a history of signals received from the other devices. Reference and/or portable devices in accordance with several embodiments can scan for known devices and collect characteristics (e.g., RSSI) in a buffer (e.g., a ring buffer) and calculate statistics (e.g., weighted averages, variances, etc.) based on a history of collected signal characteristics. In some embodiments, signal characteristics and/or calculated statistics can be identified by each of the devices, pre-processed, and transmitted to a coordinator device. Coordinator devices in accordance with various embodiments can collect and store signal information from reference devices and/or the portable device. In many embodiments, identified signal characteristics and/or calculated statistics of the signals can be stored in a matrix, that stores values for a given characteristic (e.g., RSSI).

An example of a matrix data structure for signal strength in a system is illustrated in FIG. 8. In this example, data structure 800 includes various data that can be used to store various system and signal information. Data structure 800 includes matrix 805 ("ra_mean"), with RSSI measurements from each of five reference devices. Matrix 805 includes five rows and six columns, where the intersection of each row and column represents a RSSI for a signal between a transmitting reference device (across the top of the matrix) and a receiving reference device (down the side of the matrix). The sixth column contains values for signals from the portable device to each of the five reference devices. The diagonals of the matrix are zeros (as a device does not transmit a signal to itself). In many cases, matrices can include measurements between all devices of a networked system. For large networks, systems in accordance with numerous embodiments can be represented by a sparse matrix, where the entries are blank for stations where signal is not received and/or when received signals are below some threshold value.

In numerous embodiments, the captured signal information is noisy data (e.g., raw RSSI values) that may need to be cleaned. Cleaning noisy data in accordance with various embodiments can include computing a weighted average of historic RSSI values for each signal path to reduce some of the high-frequency noise common in RSSI values. In a number of embodiments, the weighting factor can be based on timestamps of each RSSI value (e.g., weighting weight recent RSSI values more heavily and reducing the weight of older RSSI values). Timestamps in accordance with various embodiments of the invention can include timestamps for when a signal is detected at a receiver and/or transmitted from a sender.

Process 700 normalizes (715) the measured signal characteristics to estimate signal path characteristics. In many embodiments, normalizing the data can help to account for differences in the constructions of the WI-FI radios and front-end circuitries of each device based on the assumption that RSSI values associated with a signal transmitted from point A to point B should be approximately equal to the RSSI values associated with the same signal being transmitted in the opposite direction from point B to point A. Normalizing signal characteristics in accordance with some embodiments can include calculating an average of the sent and received signals of a signal path between two devices (e.g., a portable device and a reference device, and/or between two reference devices). Processes in accordance with numerous embodiments can compare RSSI values associated with each pair of signal paths (i.e., paths to and from another reference device) to identify an offset in RSSI values. In certain embodiments, identified offsets in RSSI values can be used as a basis to normalize the values to account for the differences in the construction of the radios.

Figure 9:
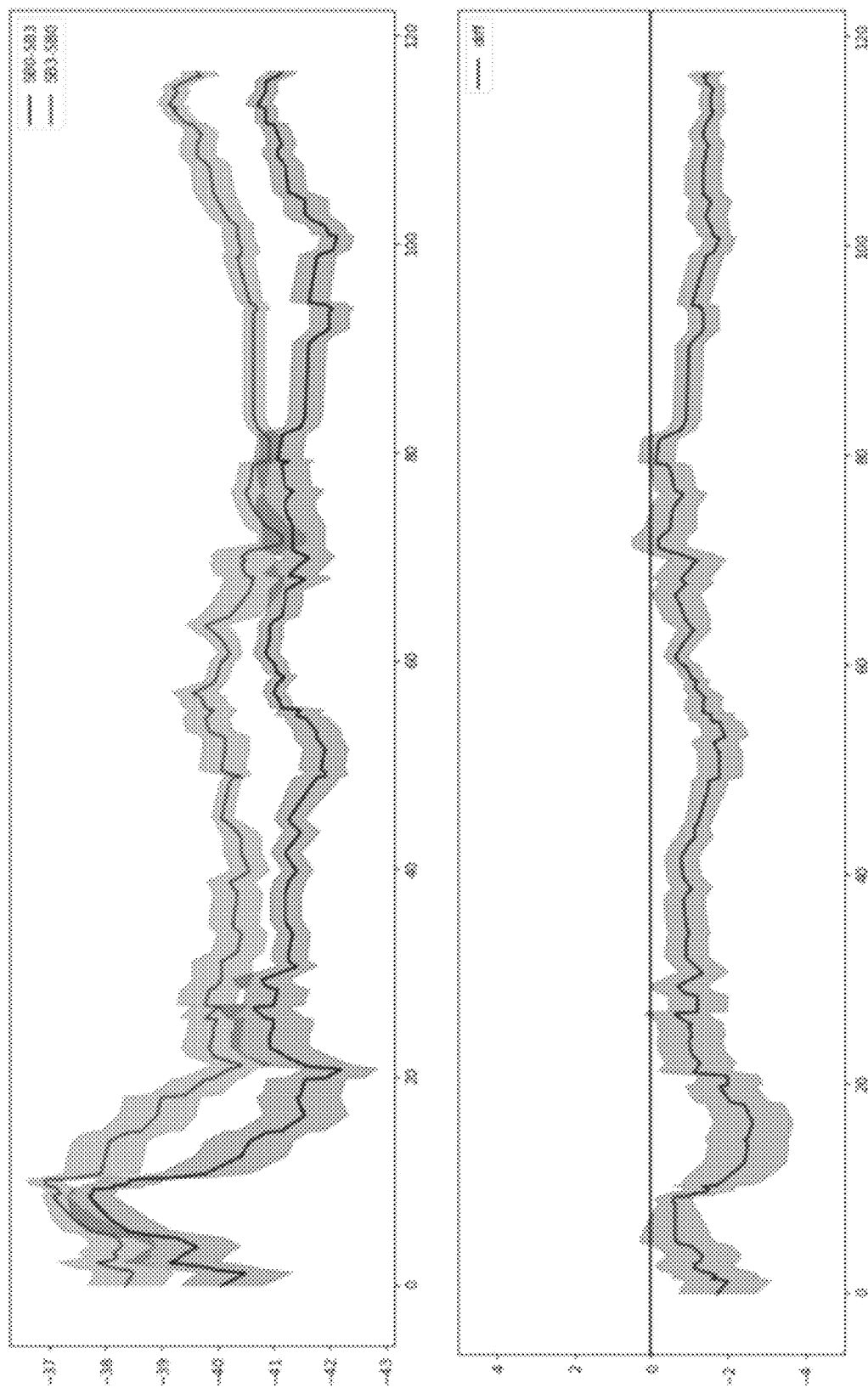
FIG. 9 illustrates an example of differences in signals based on signal direction between two devices in accordance with an embodiment.

An example of normalizing signal strengths between two devices is illustrated in FIG. 9. The first chart 905 illustrates both the measured RSSI values associated with a transmission from a first device (e.g., a Sonos Beam) to a different, second device (e.g., a Sonos One) as well as the RSSI values associated with a transmission from the second device back to the first device. In this example, the measured signals in the two directions between the devices are different, even though the signal path length between the devices remains the same. The second chart 910 illustrates a graph of the difference between the recorded signals.

Process 700 estimates (720) a likelihood that a portable device is in a particular location based on the estimated signal path characteristics. For example, processes in accordance with various embodiments can compute a probability that a given player and/or smartphone executing the Sonos app is at/near a particular location (e.g., near a particular stationary Sonos player). This computation may be performed by a Sonos player in the system and/or the controller on the smartphone. For example, a single player may aggregate all of the information (e.g., RSSI values) for the computation, perform the computation, and provide the result (e.g., to the Sonos controller app). In certain embodiments, a machine learning model is trained to estimate the likelihoods based on signal information as input that is labeled with a nearest reference device.

From an intuitive standpoint, the stronger the RSSI values associated with a given signal path, the shorter the length of the signal path. For example, if the RSSI values associated with the signal path from a roaming device to a player P1 are high, the roaming device is likely near player P1.

Because RSSI values can be obtained for a large number of signal paths, processes in accordance with a variety of embodiments can layer on additional logic to confirm that the roaming device is actually near a given device. In this example, if the roaming device is actually quite close to P1, the RSSI values associated with the signal path from the roaming device to a second player P2 should be substantially similar to the values associated with the signal path from the first player P1 to P2. Similarly, if the roaming device is actually quite close to P1, the RSSI values for the path from the remote device to a third device P3 should be substantially similar to the RSSI values for the path from P1 to P3. Accordingly, processes in accordance with numerous embodiments can analyze RSSI values associated with multiple different signal paths in an MPS to come up with a probability that a roaming device is near a given stationary device.

Processes in accordance with numerous embodiments can estimate likelihoods based on a physical/probabilistic model. In several embodiments, signal attenuation can be used as a basis, but can be modified to feed a probabilistic model. Processes in accordance with various embodiments can use the entire system (or a subset of a system) as the distance metric for total attenuation (A) since the decay constant ($\tau$) and Euclidean distance (D) are entangled within the system.

$$S_{AB} = T_A R_B A_{AB}$$

$$A_{AB} = e^{-D_{AB}/\tau}$$

where T is transmission, R is reception fraction, A is total attenuation, S is recorded signal, D is Euclidean distance, and $\tau$ is a decay constant. The total attenuation (A) is assumed identical along a same path (i.e., in both directions along the path). The notation identifies directionality of a transmission:

$$S_{(Transmitter)(Receiver)}\text{:RSSI between devices}$$

In the case of two reference devices, the probability $P_A$ that the portable device is nearest to a device A, can be computed as:

$$P_A \propto \frac{A_{AB}}{A_{BC}} \propto \frac{S_{CA}/S_{BA}}{S_{CB}/S_{AB}}$$

The probability $P_B$ that the portable device is nearest to device B, can be computed as:

$$P_B \propto (1 - P_A)$$

When there are more than three devices, physical/probabilistic models in accordance with various embodiments can provide a baseline that provides a more robust probability of the likely closest device. More generally, in numerous embodiments, the probability that a portable device is nearest to a given device F can be calculated as:

$$P_F \propto \frac{S_{MF}}{S_{MR}} \frac{S_{FR}}{S_{RF}}$$

where M is the moving device, F is a fixed station, and R is a reference station. The probability for the reference station R can then be calculated as:

$$P_j \propto \sum_{i=1, i \neq j}^{n} \frac{1 - P_i}{n - 1}$$

Figure 10:
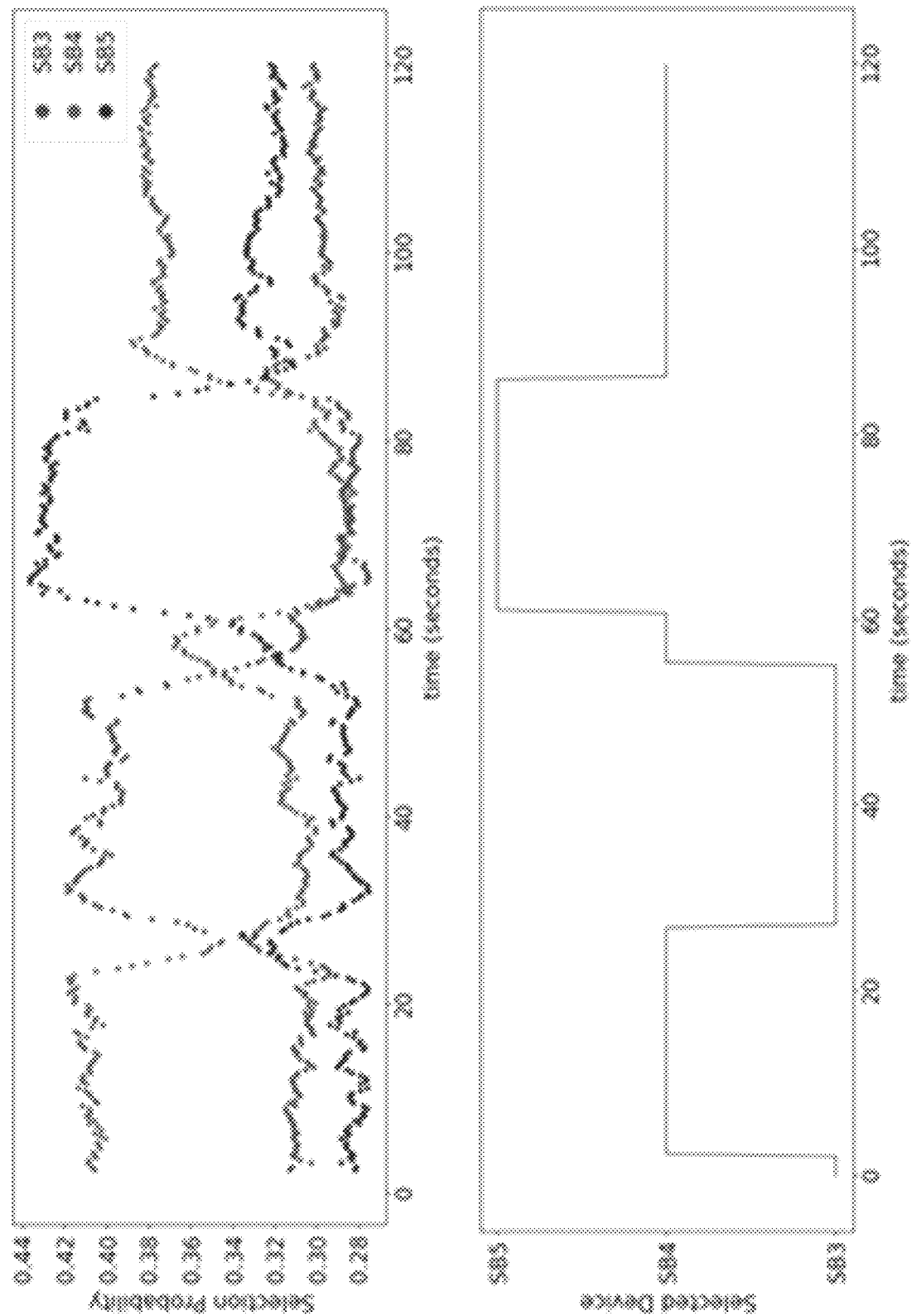
FIG. 10 illustrates an example of changing probabilities for portable device moving between reference devices in accordance with an embodiment.

In numerous embodiments, the likelihood that a portable device is nearest to a given device changes as the device moves around. An example of changing likelihoods based on movement of a portable device is illustrated in FIG. 10. The first chart 1005 shows the calculated probabilities for each of three reference devices (SB3, SB4, and SB5) and how they change over a period of time. The second chart 1010 shows the changes in the nearest device, based on the calculated probabilities, over the same period of time.

In certain embodiments, the estimated locations of portable devices can be used in a variety of applications, such as (but not limited to) controlling a nearest reference device, presenting an ordered list of nearest reference devices to a GUI of the portable device, monitoring movement through a household, etc. Estimated locations in accordance with numerous embodiments can be used as inputs to another prediction model that can be used to identify a target reference device based on the location information. In various embodiments, a probability matrix for reference devices in an MPS can be used as an input to a machine learning model that can predict a target device (or a device a user wishes to interact with). The resulting matrix in accordance with many embodiments is an n×n matrix of probabilities that can be used to define a robust metric for identifying room localization. Predicting target devices is discussed in greater detail below.

While specific processes for localizing a portable device are described above, any of a variety of processes can be utilized as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

Figure 11:
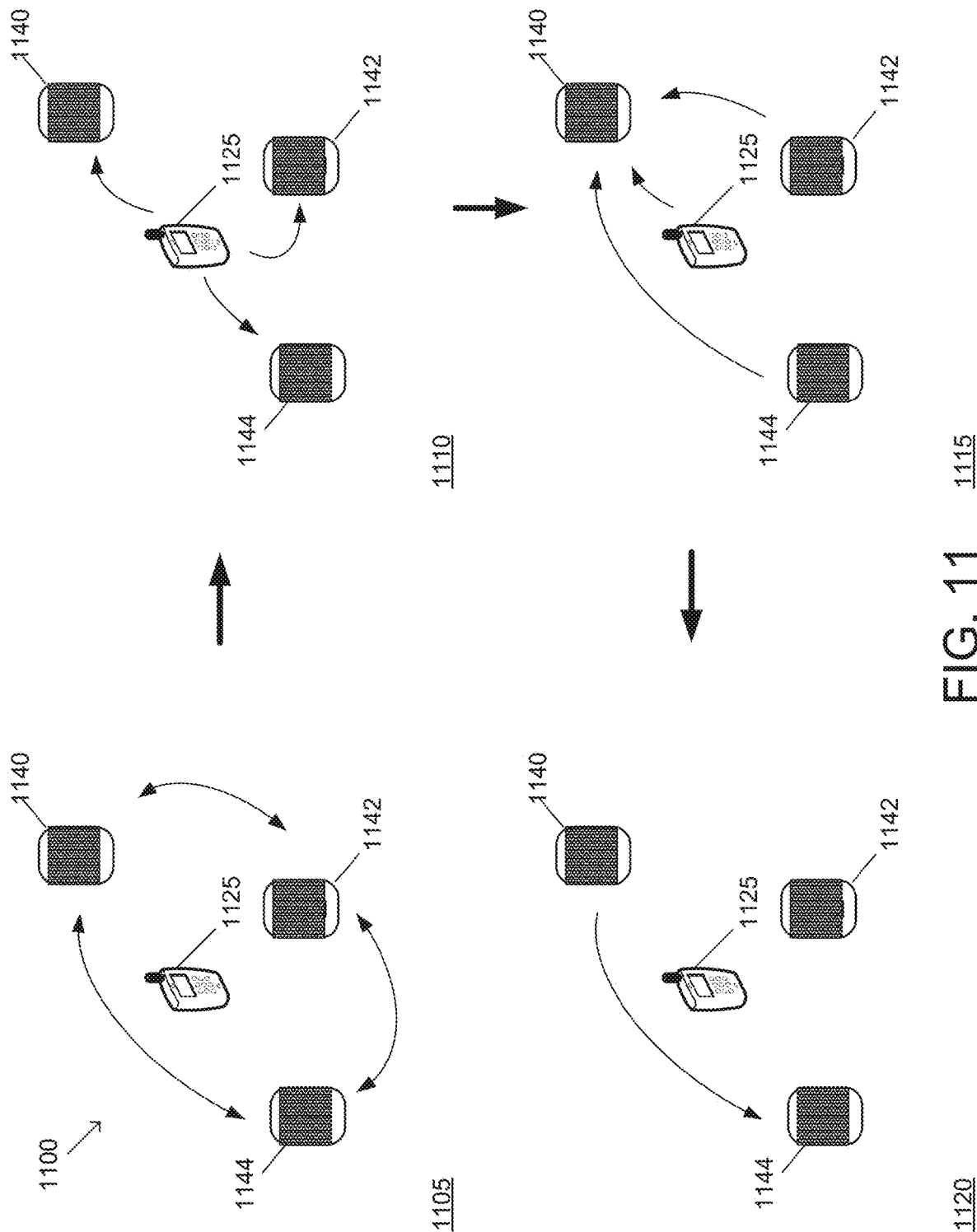
FIG. 11 illustrates an example of localizing a portable device in a networked sensor system in accordance with an embodiment.

An example of localizing a portable device in a networked sensor system in accordance with an embodiment is illustrated in four stages 1105-1120 of FIG. 11. The stages of this example show a networked system with a portable device 1125, and reference devices 1140-1144. In the first stage, reference devices 1140-1144 transmit and receive signals among each other. Signals in accordance with some embodiments are part of a wireless scan that is periodically performed by each reference device to maintain information regarding the other reference devices in an MPS.

In the second stage 1110, portable device 1125 transmits signals to reference devices 1140-1144. In this example, the portable device transmits to the reference devices, but portable devices in accordance with a number of embodiments can receive signals transmitted by the reference devices. Signal characteristics and/or statistics can be gathered and transmitted to a coordinator device for further processing.

In the third stage 1115, reference device 1140 has been selected as a coordinator device. Coordinator devices in accordance with numerous embodiments are designated to collect and process signal information from an MPS, and can be selected from the available devices of an MPS based on one or more of several factors, including (but not limited to) RSSI of signals received from the portable device at the reference devices, frequency of use, etc. The third stage 1115 shows that reference devices 1142 and 1144 send their signal information to coordinator device 1140. In many embodiments, coordinator devices can be playback devices, portable devices, controller devices, etc. For example, in some embodiments, once the individual devices have collected the proper signals from each other, the individual devices can send the signal information to the portable coordinator device, which can then process the signal information to locate the portable device. Processing in accordance with several embodiments can include (but is not limited to) cleaning the raw signal data, calculating statistics, normalizing RSSI values, and/or passing the signal information through a machine learning model to determine a nearest reference device.

In the fourth stage 1120, coordinator device 1140 communicates back with reference device 1144, which was identified as the nearest device (or group of devices). While in this example coordinator device 1140 communicates with only the target reference device, coordinator devices in accordance with numerous embodiments can communicate with one or more of the nearest devices, one or more portable devices, and/or any combination thereof without departing from the scope of the present disclosure. In many embodiments, coordinator devices can communicate various information to the devices, such as (but not limited to) playback controls, recommended content, a sorted lists of target devices, etc.

As can readily be appreciated the specific system used to localize a mobile device is largely dependent upon the requirements of a given application and should not be considered as limited to any specific computing system(s) implementation.

a. Localization Element

Figure 12:
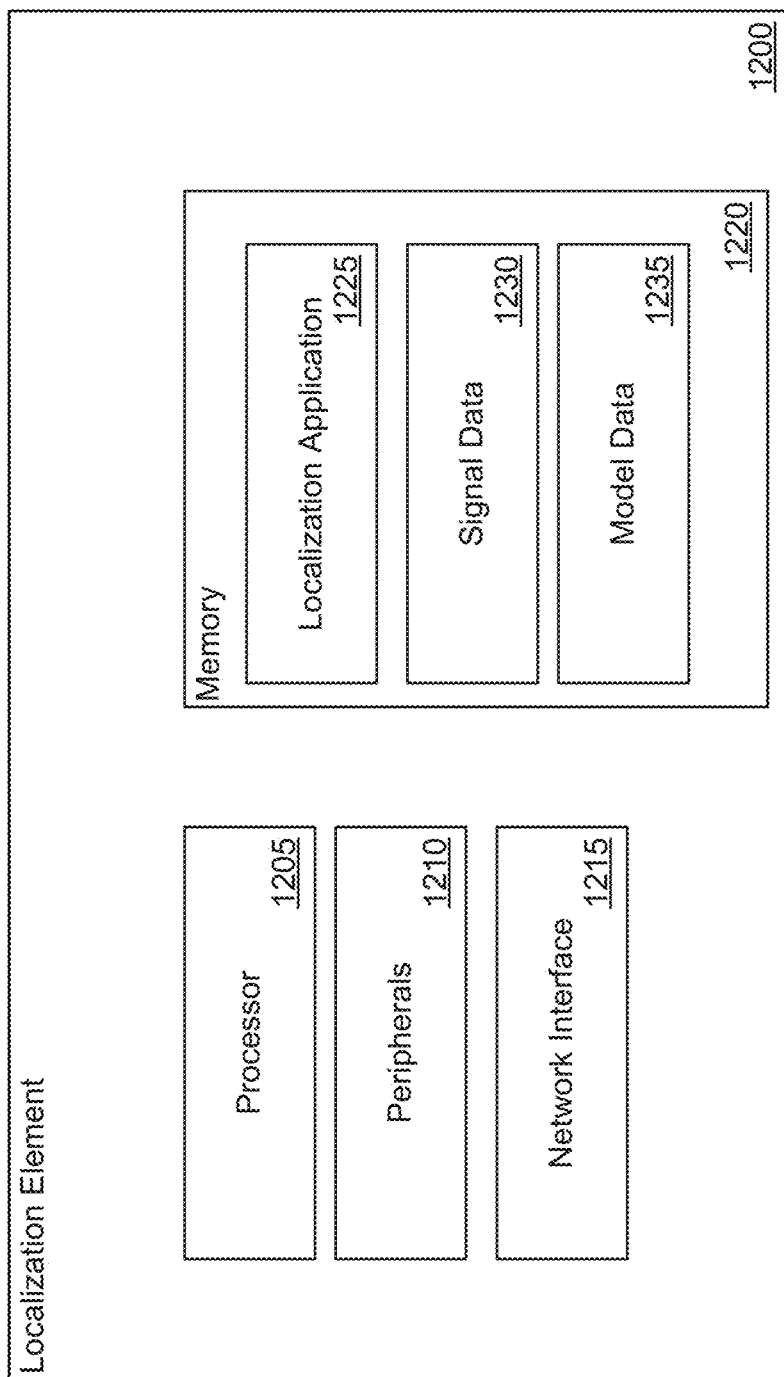
FIG. 12 illustrates an example of a localization element that localizes portable devices in accordance with an embodiment.

An example of a localization element that can execute instructions to perform processes that locate portable devices in a networked device system (e.g., an MPS) in accordance with various embodiments is shown in FIG. 12. Localization elements in accordance with many embodiments can include various networked devices, such as (but not limited to) one or more of portable devices, stationary playback devices, wireless speakers, Internet of Things (IoT) devices, cloud services, servers, and/or personal computers. In this example, localization element 1200 includes processor 1205, peripherals 1210, network interface 1215, and memory 1220. One skilled in the art will recognize that a particular localization element may include other components that are omitted for brevity without departing from the scope of the present disclosure.

The processor 1205 can include (but is not limited to) a processor, microprocessor, controller, or a combination of processors, microprocessor, and/or controllers that performs instructions stored in the memory 1220 to manipulate data stored in the memory. Processor instructions can configure the processor 1205 to perform processes in accordance with certain embodiments.

Peripherals 1210 can include any of a variety of components for capturing data, such as (but not limited to) cameras, displays, and/or sensors. In a variety of embodiments, peripherals can be used to gather inputs and/or provide outputs. Network interface 1215 allows localization element 1200 to transmit and receive data over a network based upon the instructions performed by processor 1205. Peripherals and/or network interfaces in accordance with many embodiments can be used to gather inputs (e.g., signals, user inputs, and/or context information) that can be used to localize portable devices.

Memory 1220 includes a localization application 1225, signal data 1230, and model data 1235. Localization applications in accordance with several embodiments can be used to localize portable devices in a networked system of devices. In numerous embodiments, signal data can include data captured at the localization element. Signal data in accordance with a number of embodiments can include signal information received from other reference devices and/or portable devices. Model data in accordance with some embodiments can include parameters for a machine learning model trained to generate probabilistic location information based on input signal characteristics.

Although a specific example of a localization element 1200 is illustrated in FIG. 12, any of a variety of such elements can be utilized to perform processes similar to those described herein as appropriate to the requirements of specific applications in accordance with embodiments.

b. Localization Application

Figure 13:
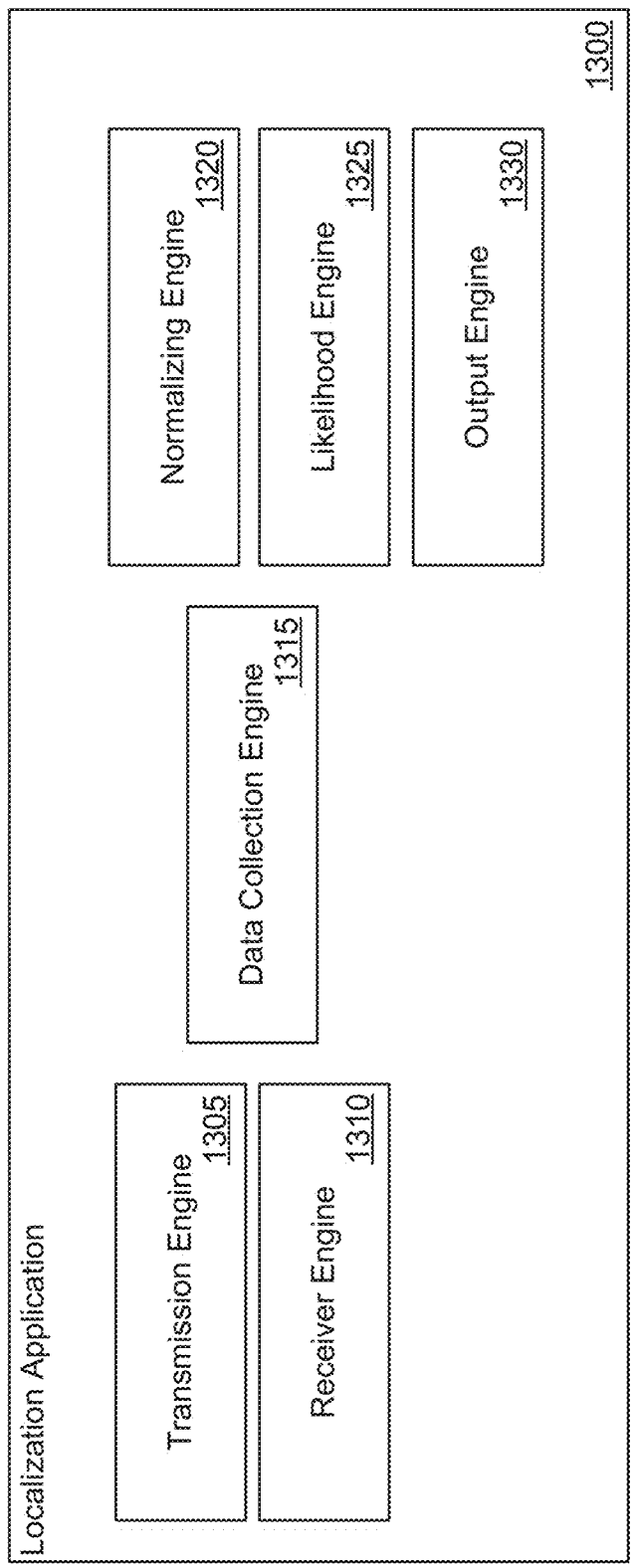
FIG. 13 illustrates an example of a localization application in accordance with an embodiment.

FIG. 13 illustrates an example of a localization application in accordance with an embodiment. Localization applications in accordance with a variety of embodiments can be used for locating portable devices in a networked system. In this example, the localization application includes transmission engine 1305, receiver engine 1310, data collection engine 1315, normalizing engine 1320, likelihood engine 1325, and output engine 1330. As can readily be appreciated, localization applications can be implemented using any of a variety of configurations appropriate to the requirements of specific applications.

Transmission engines and receiver engines in accordance with a variety of embodiments can be used to transmit and receive signals between reference devices and/or portable devices. In many embodiments, transmission engines can broadcast wireless signals as part of a periodic wireless scan. Receiver engines in accordance with certain embodiments can receive signals broadcast by other reference devices and/or the portable device.

Data collection engine 1315 collects signal data from the other devices of the MPS. In many embodiments, data collection engines can also perform some pre-processing and/or cleaning of the signal data. In a number of embodiments, pre-processing and/or cleaning are distributed between a coordinator device and one or more reference devices. Data collection engines in accordance with a number of embodiments can maintain a history of signal data in order to compute statistics (e.g., weighted averages) of the historic signal data.

Once the data has been collected, normalizing engine 1320 can normalize the collected data. Normalizing signal characteristics in accordance with some embodiments can include calculating an average of the sent and received signals of a signal path between two devices (e.g., a portable device and a reference device, and/or between two reference devices).

Likelihood engines in accordance with a number of embodiments can compute the likelihood that a portable device is nearest to a particular reference device of an MPS. In various embodiments, likelihood engines can include a physical/probabilistic model to estimate likelihoods based on signal strengths for signals received from reference devices and the portable device in relation to each other. Likelihood engines in accordance with a variety of embodiments can calculate signal strength ratios for signals received at various devices in an MPS, where the probability that the portable device is nearest to a particular reference device is a ratio between a first signal ratio for signals received at the particular reference device and a second signal ratio for signals received at a second reference device.

In a variety of embodiments, output engines can provide outputs to a display and/or transmit instructions and/or information to devices in an MPS based on the computed likelihoods. Outputs in accordance with some embodiments can include but are not limited notifications, alerts, playback controls, ordered device listings, etc. In various embodiments, outputs can include a probability matrix that can be used as an input to a prediction model. Prediction models in accordance with numerous embodiments are discussed in greater detail below.

Although a specific example of a localization application 1300 is illustrated in FIG. 13, any of a variety of localization applications can be utilized to perform processes for localizing portable devices similar to those described herein as appropriate to the requirements of specific applications in accordance with embodiments. In some embodiments, one or more of the above elements may be omitted and/or additional elements may be added.

IV. User Interaction Prediction

Systems and methods in accordance with several embodiments can be used to train prediction models and/or to predict target devices using trained prediction models. For example, a coordinator device in accordance with various embodiments can predict a stationary playback device that a user would want to interact with next (which may or may not be the player closest to them) using a machine learning model that learns over time.

Processes in accordance with numerous embodiments can build and train a machine learning model that can receive signal characteristics (e.g., raw or pre-processed RSSI values) as input and generate, based on those signal characteristics, an indication of the reference device (e.g., a stationary player) that a person is standing near. In certain embodiments, the information that the person is standing near a particular device can be used to drive new user experiences (e.g., highlighting the speakers in the Sonos app a user is standing closest to, shifting music to play on different speakers as a user walks through a space). However, in some cases, a user may want to control a speaker other than the one to which they are closest. For example, the user may always turn on the kitchen Sonos speakers first thing in the morning from their bedroom because that is the room they intend to go to next. As a result, the underlying assumption that a user wants to always interact with the closest player doesn't hold in many situations.

In some embodiments, user interaction information can be leveraged to identify these types of unique user behaviors. In many embodiments, new training data can be constructed from these types of unique user behaviors that can be used to train (and/or retrain) a machine learning model to identify the desired interactions. In numerous embodiments, a predictive machine model is initially trained to identify the closest stationary speaker, and is then retrained with new training data that is specific to the user and/or household. In certain embodiments, the predictive machine model is initially trained using a singular value decomposition of the probability matrix as input and an online training process is used as more data is collected to build a more sophisticated model. In many embodiments, various local online models can be used as interactions are refined; such that data can remain private and does not need to be sent out to remote computing devices. Thus, the predictive model can start to take into account the particular patterns of the user. As a result, predictive machine learning models in accordance with various embodiments can adapt over time to each particular user so that the "best guess" of the device they want to interact with next may get better over time.

Predicting a target device (or user interaction) in accordance with various embodiments can be used to simplify controllers in an MPS. For example, upon detecting activation of a "Play/Pause" button in the Sonos App, the Play/Pause command can be automatically applied only to those players that are proximate the user's smartphone. In another example, the particular player (or zone group) that an individual is standing near can be emphasized (e.g., highlighted, made bold, etc.) in the Sonos App to help the individual to control the correct zone group (instead of another zone group).

In a number of embodiments, predicted target devices can be used to swap content between devices. For example, processes in accordance with many embodiments can allow a user wearing headphones to transition (e.g., via a gesture on the capacitive touch sensor on the headphones) music from being played on the headphones to being played on nearby speakers.

Figure 14:
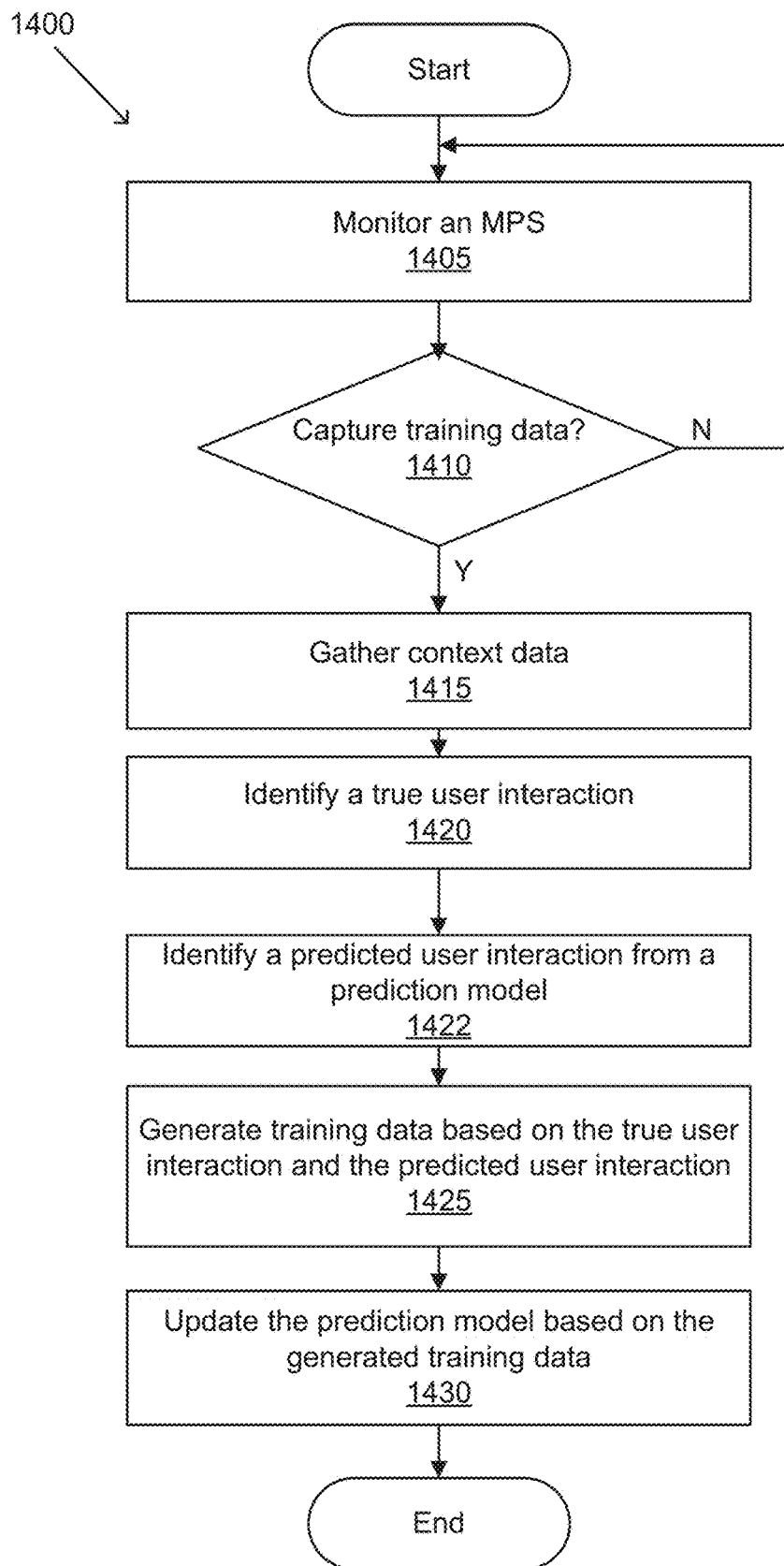
FIG. 14 conceptually illustrates an example of a process for training a prediction model in accordance with an embodiment.

An example of a process for training a prediction model in accordance with an embodiment is conceptually illustrated in FIG. 14. In a number of embodiments, prediction models operate and/or are re-trained locally at one of the devices in an MPS, allowing the prediction models to continually adjust to a user's interactions.

Process 1400 monitors (1405) an MPS. In a variety of embodiments, monitoring an MPS can include monitoring (but is not limited to) the location (or trajectory) of one or more portable devices within an MPS, user interactions with devices (e.g., portable, stationary, playback, controllers, etc.) of the MPS, and/or predictions of user interactions by a prediction model of the MPS.

Process 1400 determines (1410) whether to capture a training data sample based on the monitoring of the MPS. The determination of whether to capture training data can be based on a number of different criteria. For example, in certain embodiments, processes can determine to capture a training data sample when a confidence level for a prediction for the location of a portable device is below a particular threshold. There will likely be instances where the output of a prediction model is fluctuating between two states or otherwise has a low confidence answer. In these scenarios, processes in accordance with various embodiments can determine to capture training data samples to identify a user's true interactions in order to identify a correct answer. For example, processes in accordance with a number of embodiments can identify the next speaker that the user interacts with as the "correct" answer and pair that correct answer with the RSSI values during that low-confidence scenario to form a new training data point.

Processes in accordance with many embodiments can determine whether to capture a training data sample based on a user's actual (and/or predicted) interactions (e.g., initiating playback, changing the currently playing content, voice commands, physical interactions, etc.) with a device in an MPS. In certain embodiments, training data samples are captured when a predicted user interaction does not match with the user's actual interaction. For example, the prediction model may predict "living room speaker," but the speaker that a user actually controls using the Sonos app is "bedroom."

When the process determines (1410) not to capture training data, the process returns to step 1405 and continues to monitor the MPS. When the process determines (1410) to capture training data, the process gathers (1415) context data. In numerous embodiments, context data can provide insight to other factors that may affect a user's interactions beyond the location of the user within the MPS. Context data in accordance with several embodiments can include (but is not limited to) location data, time data, user data, and/or system data. Examples of such data can include a probability matrix of nearest devices, time of day, day of week, user ID, user preferences, device configuration, currently playing content, etc.

Process 1400 identifies (1420) a true user interaction. User interactions can be used as a source of ground truth for a machine learning prediction model. In a variety of embodiments, user interactions can include interactions with a SONOS device (e.g., taps one or more of the physical buttons on a SONOS player), voice interactions with a SONOS device (e.g., a SONOS player that responds to a voice command), and/or responses to system notifications (e.g., a pop-up via the Sonos app saying "What speaker are you closest to?"). User responses in accordance with certain embodiments can include (but are not limited to) selecting a target speaker for playing content from a GUI of a controller device, stopping all playback in the MPS, etc. True user interactions in accordance with numerous embodiments can include the non-performance of a predicted interaction (e.g., when a prediction model predicts that a user will initiate playback on a kitchen speaker, but the user takes no action at all).

Process 1400 identifies (1422) a predicted user interaction using a prediction model. Prediction models in accordance with numerous embodiments can be trained to take in context data and to predict a desired user interaction. In a variety of embodiments, context data includes a probability matrix that is computed as described in examples above. In several embodiments, prediction models are pre-trained based on general data and can then be refined based on local data specific to a user or household. Prediction models in accordance with a variety of embodiments can be used to predict various elements of a user interaction, including (but not limited to) a target playback device to be used, specific content to be played on a playback device, modifying the volume of playback, transferring playback between playback devices, etc.

Process 1400 generates (1425) training data based on the true user interaction and the predicted user interaction. Training data in accordance with several embodiments can include (but is not limited to) the gathered context data labeled with the true user interaction and/or some aspect thereof (e.g., a target device). In certain embodiments, training data can be used in an online training process to update the prediction model based on the new training data samples.

Process 1400 updates (1425) the prediction model based on the generated training data. Updating the prediction model in accordance with many embodiments can include updating weights and/or other parameters of the prediction model based on its ability to predict the true user interaction. In various embodiments, the prediction model is only updated after a threshold number of training data samples have been gathered. In various embodiments, when a new device is added to an MPS and has no usage information, processes can update the prediction model with the new device and provide an initialization probability for the new device. Initialization probabilities in accordance with many embodiments can be static initial values to ensure that new devices are at least initially available to a user. In certain embodiments, initialization probabilities can be based on the location of the new device (e.g., the initialization probabilities for a new device in the living room can be initiated with probabilities similar to those of other nearby speakers). As additional training data samples are gathered, the initialization values can be adjusted based on actual usage.

While specific processes for predicting user interactions are described above, any of a variety of processes can be utilized as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

a. Prediction Element

Figure 15:
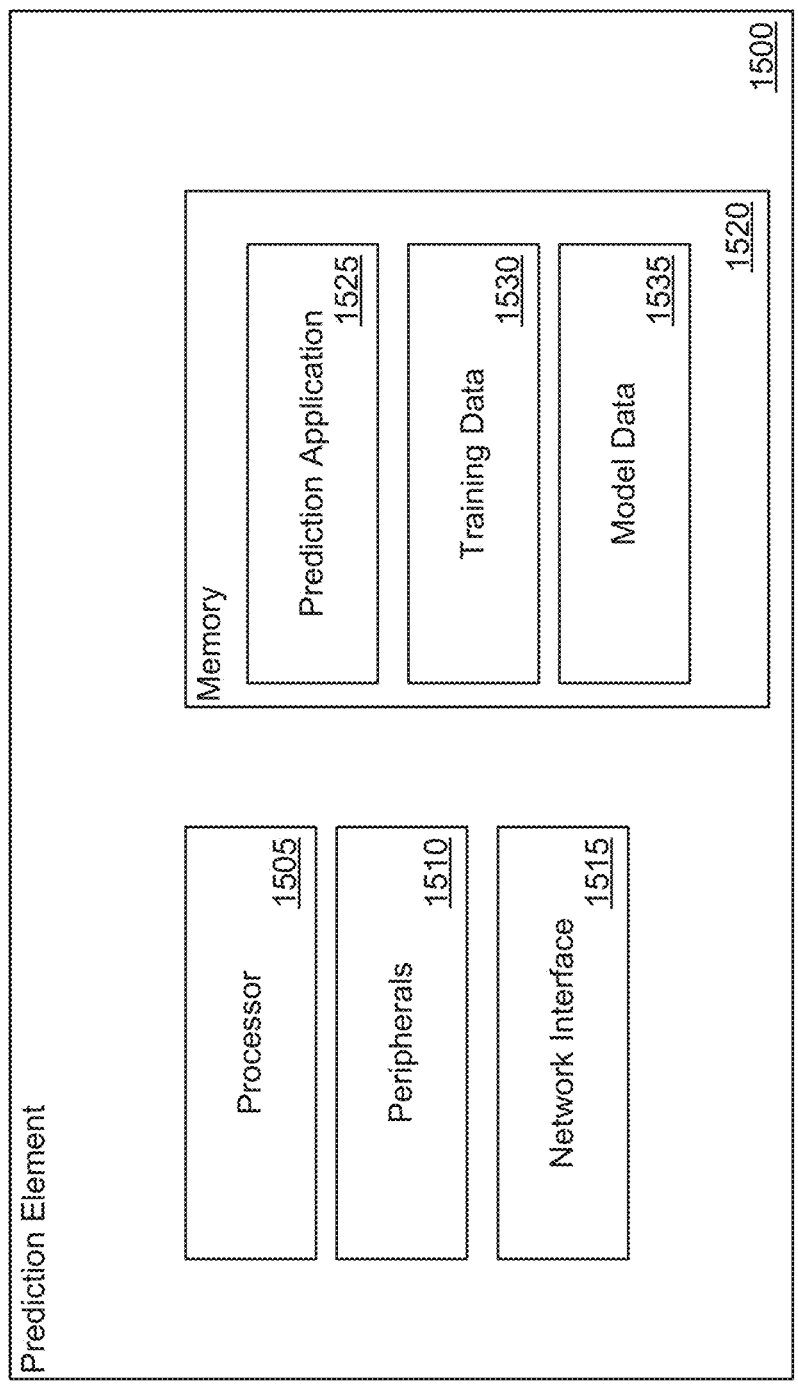
FIG. 15 illustrates an example of a prediction element that trains and predicts target devices in accordance with an embodiment.

FIG. 15 illustrates an example of a prediction element that trains and predicts target devices in accordance with an embodiment. Prediction elements in accordance with various embodiments can include (but are not limited to) controller devices, playback devices, and/or server systems. In this example, prediction element 1500 includes processor 1505, peripherals 1510, network interface 1515, and memory 1520. One skilled in the art will recognize that a particular localization element may include other components that are omitted for brevity without departing from the scope of the present disclosure.

The processor 1505 can include (but is not limited to) a processor, microprocessor, controller, or a combination of processors, microprocessor, and/or controllers that performs instructions stored in the memory 1520 to manipulate data stored in the memory. Processor instructions can configure the processor 1505 to perform processes in accordance with certain embodiments.

Peripherals 1510 can include any of a variety of components for capturing data, such as (but not limited to) cameras, displays, and/or sensors. In a variety of embodiments, peripherals can be used to gather inputs and/or provide outputs. Network interface 1515 allows prediction element 1500 to transmit and receive data over a network based upon the instructions performed by processor 1505. Peripherals and/or network interfaces in accordance with many embodiments can be used to gather inputs (e.g., signals, user inputs, and/or context information) that can be used to predict user interactions.

Memory 1520 includes a prediction application 1525, training data 1530, and model data 1535. Prediction applications in accordance with several embodiments can be used to predict user interactions (e.g., target devices, desired control actions, etc.) in a networked system of devices. In numerous embodiments, training data can include data generated at the prediction element based on true and/or predicted user interactions. Model data in accordance with some embodiments can include parameters for a machine learning model trained to generate probabilistic location information based on input signal characteristics.

Various parts of described systems and methods for predicting and/or training prediction models described herein can be performed on a networked device and/or remotely, for example, on remote computing device(s). In at least some embodiments, any or all of the parts of the methods described herein can be performed on networked device rather than at remote computing devices.

Although a specific example of a prediction element 1500 is illustrated in FIG. 15, any of a variety of such elements can be utilized to perform processes similar to those described herein as appropriate to the requirements of specific applications in accordance with embodiments.

b. Prediction Application

Figure 16:
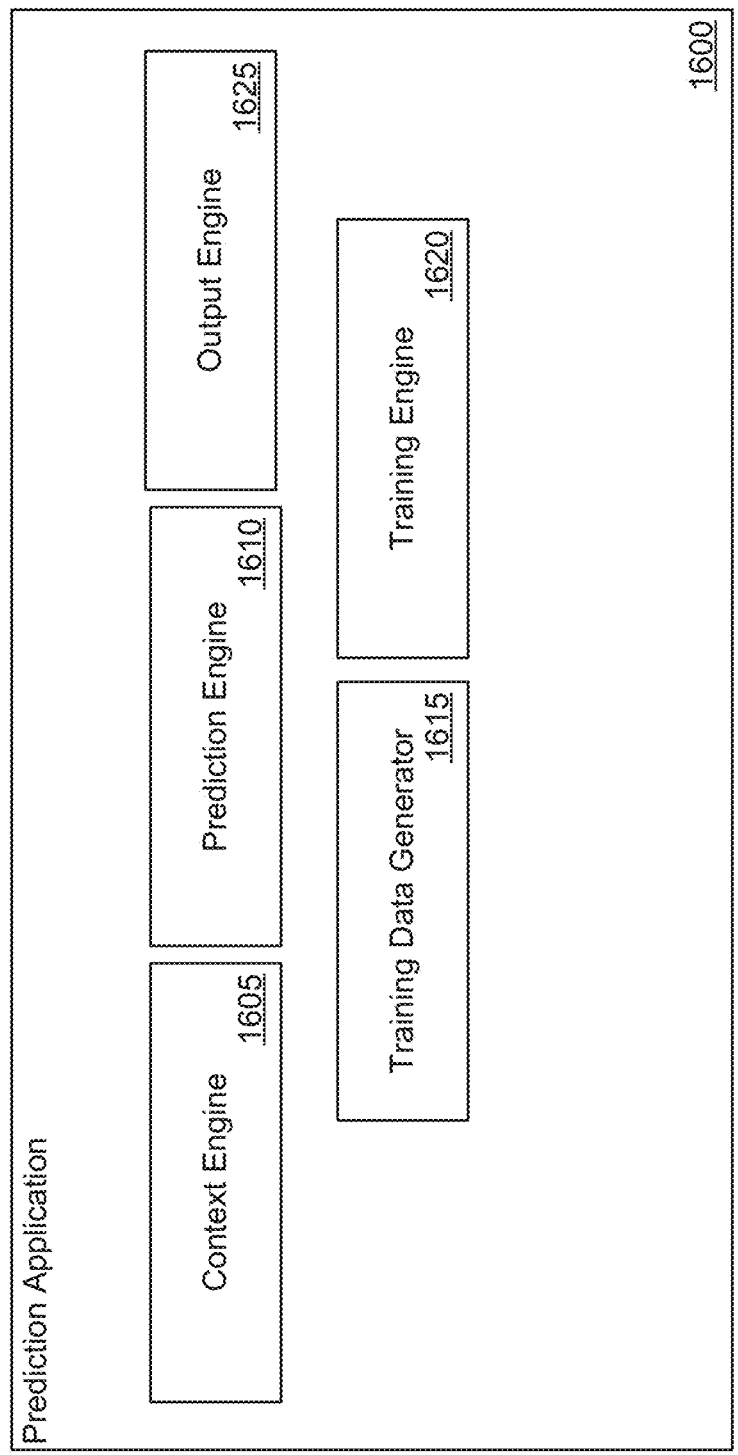
FIG. 16 illustrates an example of a prediction application in accordance with an embodiment.

FIG. 16 illustrates an example of a prediction application in accordance with an embodiment. Prediction applications in accordance with many embodiments can be used to predict user interactions based on context data, including (but not limited to) localization information, user data, system state data, etc. Prediction application 1600 includes context engine 1605, prediction engine 1610, training data generator 1615, training engine 1620, and output engine 1625.

Context engines in accordance with various embodiments can gather context information that can be used to predict a user's interactions. In some embodiments, context engines can perform localization processes for a portable device to generate a probability matrix that can be used as an input to a prediction engine. In a variety of embodiments, context information can include identity information for different users (or devices) in a home, allowing the prediction model to customize the predictions for each user. Context engines in accordance with various embodiments can determine system states (e.g., which devices are playing content, what content is being played, which devices have been used recently, etc.). In certain embodiments, context engines can provide the context to a prediction engine to predict a user's interactions.

In several embodiments, prediction engines can take context information and predict user interactions based on the context information. User interactions in accordance with a variety of embodiments can include (but are not limited to) physical interactions, voice interactions, and/or selections of a target device (e.g., through a GUI of a controller). In a number of embodiments, prediction engines can include a machine learning model such as (but not limited to) neural networks, adversarial networks, and/or logistic regression models that can be trained to predict (or classify) a user interaction based on a given context.

Output engines in accordance with numerous embodiments can provide various outputs based on predicted user interactions from a prediction engine. In certain embodiments, output engines can provide a list of target devices, sorted by a likelihood of being the desired target device for a user interaction, which can be displayed at a controller device to allow a user to have quick access to controls for the most likely target devices. Output engines in accordance with a number of embodiments can transmit control instructions (e.g., to initiate playback, stop playback, modify volume, etc.) to playback devices in an MPS.

Training data generators in accordance with some embodiments can generate training data based on a user's interactions with devices in a system. In many embodiments, training data generators can perform processes similar to those of FIG. 14 to generate training data samples that include context data and true user interactions.

In many embodiments, training engines can train prediction engines in an online fashion using training data generated based on user interactions with an MPS. In a variety of embodiments, training engines can compute losses based on a difference between a predicted user interaction and an actual user interaction. For example, when a prediction engine predicts a user's actual interaction with a confidence level of 0.6, the loss can be computed as 0.4. Computed losses can be used to update parameters for a model (e.g., through backpropagation to update weights of a neural network).

Although a specific example of a prediction application 1600 is illustrated in FIG. 16, any of a variety of localization applications can be utilized to perform processes for localizing portable devices similar to those described herein as appropriate to the requirements of specific applications in accordance with embodiments. In some embodiments, one or more of the above elements may be omitted and/or additional elements may be added.

c. Example Applications

Figure 17A:
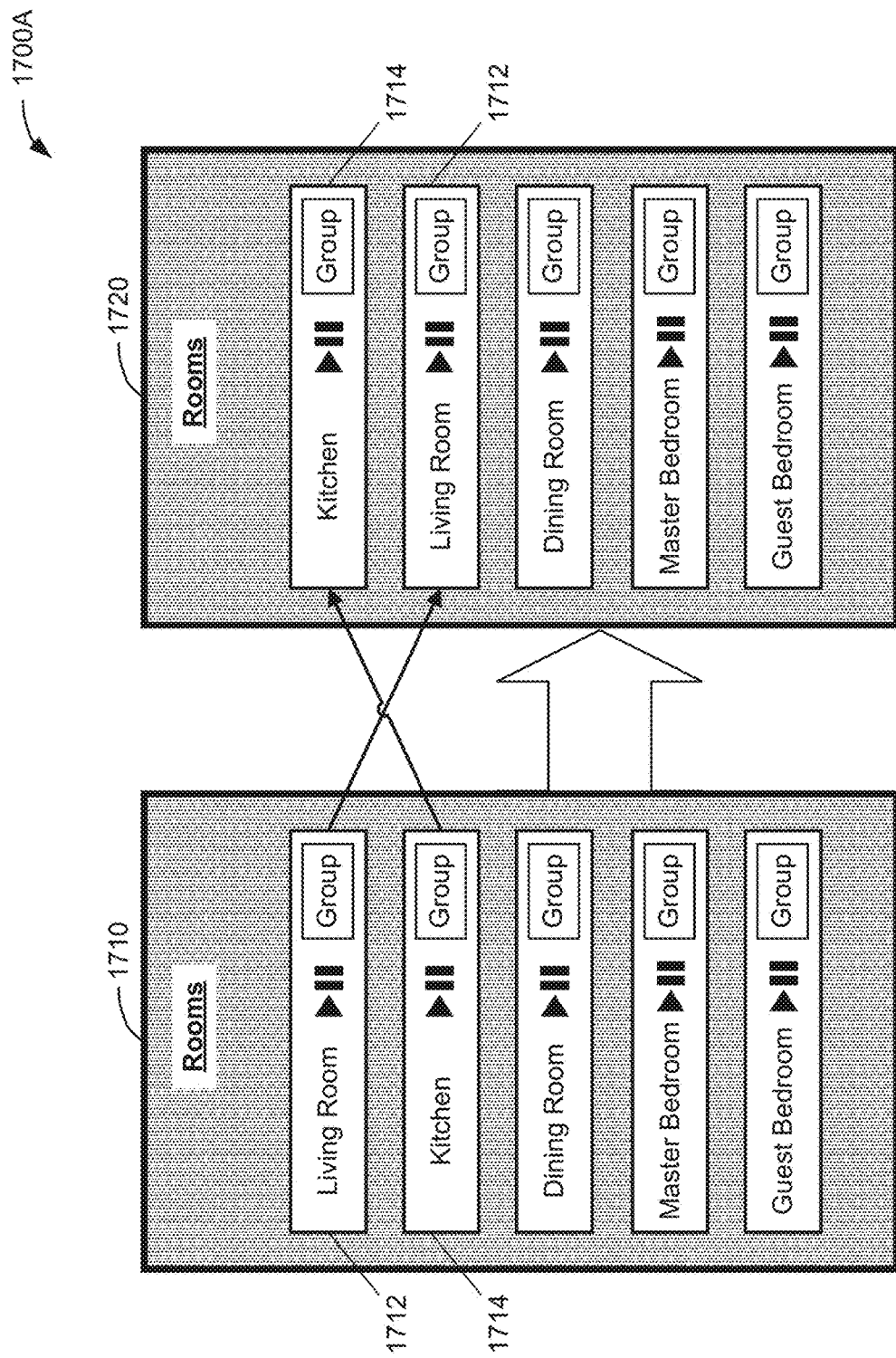
FIGS. 17A-B illustrate examples of a graphical user interface (GUI) based on predicted target devices.
Figure 17B:
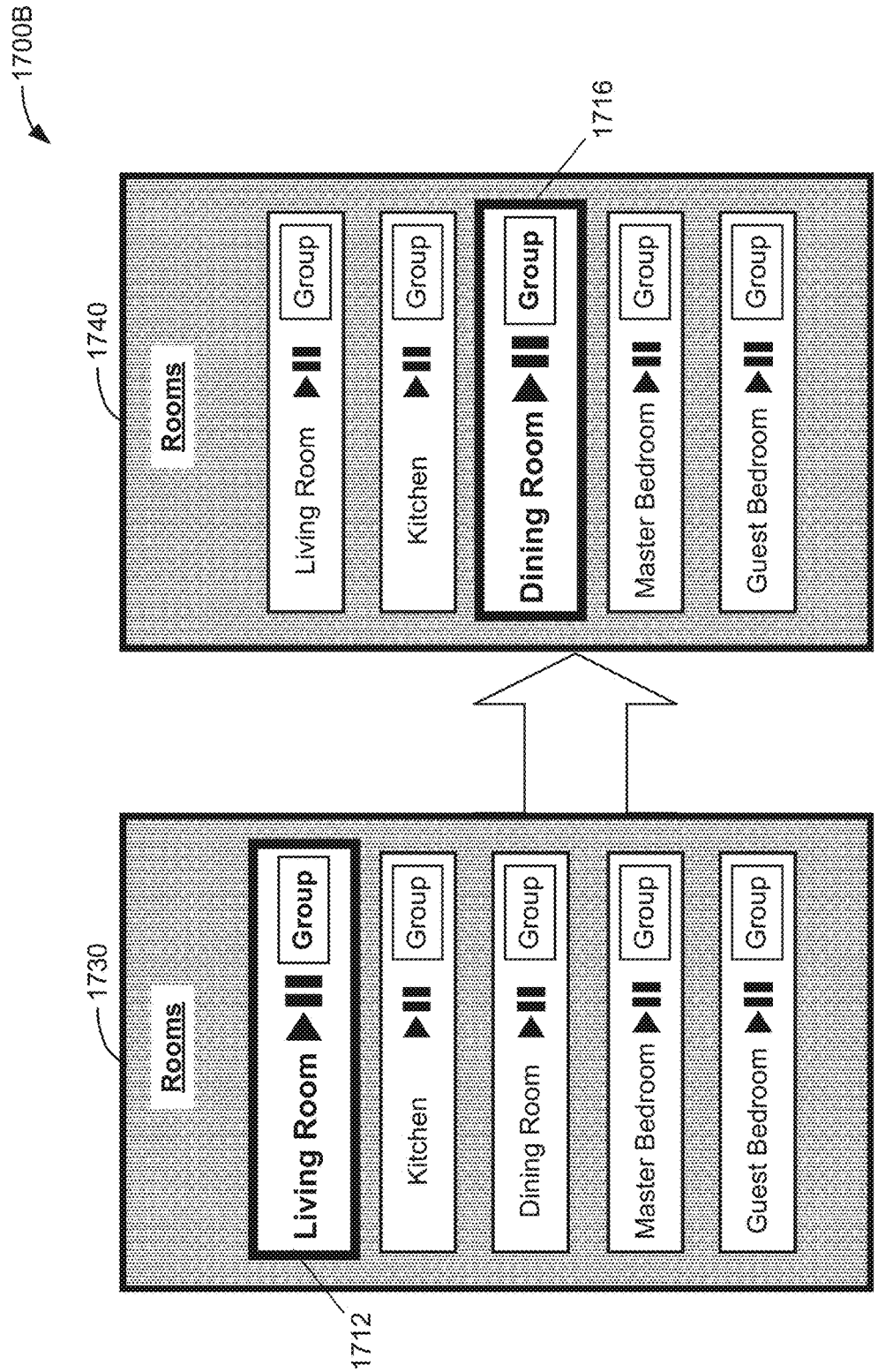

Predicting target devices can have various applications in an MPS, such as (but not limited to) automated playback of content at a target device, ranked and/or filtered lists of target devices, etc. Examples of a graphical user interface (GUI) based on predicted target devices are illustrated in FIGS. 17A-B. FIG. 17A illustrates GUI 1700A in two stages 1710 and 1720. The first stage 1710 shows GUI 1700A with control elements (e.g., control element 1712 for the Living Room and control element 1714 for the Kitchen) for controlling playback at different areas of a home. The second stage 1720 shows GUI 1700A after a target device prediction process. In this example, the target device prediction process has predicted (e.g., based on the time of day, user's relative location, etc.) that the Kitchen is more likely to be the target device (or region) than the Living Room. In the second stage 1720, the positions of control element 1712 for the Living Room and control element 1714 for the Kitchen have been switched, moving the control element 1714 for the Kitchen into the top position.

Similarly, FIG. 17B shows GUI 1700B in two stages 1730 and 1740. The first stage 1730 shows GUI 1700B with control elements (e.g., control element 1712 for the Living Room) for controlling playback at different areas of a home. The control element 1712 for the Living Room has been highlighted as the most likely to be the target device. The second stage 1740 shows GUI 1700B after a target device prediction process, where the target device prediction process has predicted (e.g., based on the time of day, user's relative location, etc.) that the Dining Room is more likely to be the target device (or region) than the Living Room. In the second stage 1740, the positions of control elements do not change, but now the control element 1716 for the Dining Room is highlighted instead of the control element 1712 for the Living Room. GUIs in accordance with some embodiments of the invention can implement various different approaches to emphasizing a target device, such as (but not limited to) displaying a limited (e.g., the top n) list of target devices, reducing the contrast of non-target devices, displaying target devices in a different color and/or size, placement of controls for predicted target devices within the display, etc.

Although specific examples of a GUI are illustrated in FIGS. 17A-B, any of a variety of such GUIs can be utilized to perform processes similar to those described herein as appropriate to the requirements of specific applications in accordance with embodiments.

V. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

In addition to the examples described herein with respect to stationary playback devices, embodiments of the present technology can be applied to headphones, earbuds, or other in- or over-ear playback devices. For example, such in- or over-ear playback devices can include noise-cancellation functionality to reduce the user's perception of outside noise during playback. In some embodiments, noise classification can be used to modulate noise cancellation under certain conditions. For example, if a user is listening to music with noise-cancelling headphones, the noise cancellation feature may be temporarily disabled or down-regulated when a user's doorbell rings. Alternatively or additionally, the playback volume may be adjusted based on detection of the doorbell chime. By detecting the sound of the doorbell (e.g., by correctly classifying the doorbell based on received sound metadata), the noise cancellation functionality can be modified so that the user is able to hear the doorbell even while wearing noise-cancelling headphones. Various other approaches can be used to modulate performance parameters of headphones or other such devices based on the noise classification techniques described herein.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A user device comprising:
one or more processors;
a touch-screen display configured to display a graphical user interface;
at least one processor; and
at least one non-transitory computer-readable medium comprising program instructions that are executable by the at least one processor such that the user device is configured to:
after receipt of context data comprising localization data that describes a location of the user device, identify a predicted stationary playback device from a plurality of stationary playback devices in a media playback system using a prediction model that takes the context data as input and predicts a predicted stationary playback device as output;
update the graphical user interface displayed on the touch-screen display based on the predicted stationary playback device;
detect, via the touch-screen display, an input identifying a target stationary playback device from the plurality of stationary playback devices;
after detection of the input identifying the target stationary playback device, cause the target stationary playback device to perform at least one operation;
generate training data based on the predicted stationary playback device and the detected input; and
update the prediction model based on the generated training data, wherein updating the prediction model comprises:
computing a loss, wherein the loss is derived from and inversely proportional to a confidence level that the predicted stationary playback device is the target stationary playback device; and
updating weights of the prediction model based on the computed loss.

2. The user device of claim 1, wherein the program instructions that are executable by the at least one processor such that the user device is configured to identify the predicted stationary playback device comprises program instructions that are executable by the at least one processor such that the user device is configured to:
provide a set of inputs to the prediction model, the set of inputs comprising the localization data; and
generate probabilities for each stationary playback device of the plurality of stationary playback devices using the prediction model.

3. The user device of claim 2, wherein the program instructions that are executable by the at least one processor such that the user device is configured to identify the predicted stationary playback device comprises program instructions that are executable by the at least one processor such that the user device is configured to:
identify the stationary playback device with a highest probability as the predicted stationary playback device.

4. The user device of claim 2, wherein the program instructions that are executable by the at least one processor such that the user device is configured to identify the predicted stationary playback device comprises program instructions that are executable by the at least one processor such that the user device is configured to:
rank at least a subset of the plurality of stationary playback devices based on the generated probabilities for each stationary playback device.

5. The user device of claim 4, wherein the program instructions that are executable by the at least one processor such that the user device is configured to update the graphical user interface displayed on the touch-screen display comprises program instructions that are executable by the at least one processor such that the user device is configured to:

update the graphical user interface displayed on the touch-screen display based on the ranking of at least the subset of the plurality of stationary playback devices.

6. The user device of claim 5, wherein the program instructions that are executable by the at least one processor such that the user device is configured to update the graphical user interface displayed on the touch-screen display comprises program instructions that are executable by the at least one processor such that the user device is configured to:
update the graphical user interface to comprise an order listing of at least some of the plurality of stationary playback devices based on the ranking of at least the subset of the plurality of stationary playback devices.

7. The user device of claim 1, wherein the program instructions that are executable by the at least one processor such that the user device is configured to detect the input identifying the target stationary playback device comprises program instructions that are executable by the at least one processor such that the user device is configured to:
detect, via the touch-screen display, a control command for the target stationary playback device.

8. The user device of claim 7, wherein the control command comprises a command to perform one or more of: modifying a volume setting, modifying an equalization setting, initiating playback, or pausing playback.

9. The user device of claim 7, wherein the program instructions that are executable by the at least one processor such that the user device is configured to cause the target stationary playback device to perform at least one operation comprises program instructions that are executable by the at least one processor such that the user device is configured to:
cause the target stationary playback device to perform the at least one operation based on the control command.

10. The user device of claim 1, wherein the localization data comprises a matrix of probabilities.

11. The user device of claim 1, wherein the context data further comprises one or more of a time of day, a day of week, or a user identity.

12. The user device of claim 1, wherein the program instructions that are executable by the at least one processor such that the user device is configured to generate the training data comprises program instructions that are executable by the at least one processor such that the user device is configured to:
store the context data as a training data sample and an identification of the target stationary playback device as a label for the training data sample.

13. A method of operation for a user device comprising at least one processor and a touch-screen display, the method comprising:
receiving context data comprising localization data that describes a location of the user device;
identifying, using the at least one processor, a predicted stationary playback device from a plurality of stationary playback devices in a media playback system using a prediction model that takes the context data as input and predicts a predicted stationary playback device as output;
updating a graphical user interface displayed on the touch-screen display based on the predicted stationary playback device;
detecting, via the touch-screen display, an input identifying a target stationary playback device from the plurality of stationary playback devices;
causing the target stationary playback device to perform at least one operation;

generating training data based on the predicted stationary playback device and the detected input; and
updating the prediction model based on the generated training data, wherein updating the prediction model comprises:
computing a loss based, wherein the loss is derived from and inversely proportional to a confidence level that the predicted stationary playback device is the target stationary playback device; and
updating weights of the prediction model based on the computed loss.

14. The method of claim 13, wherein identifying the predicted stationary playback device comprises:
providing a set of inputs to the prediction model, the set of inputs comprising the localization data; and
generating probabilities for each stationary playback device of the plurality of stationary playback devices using the prediction model.

15. The method of claim 14, wherein identifying the predicted stationary playback device comprises:
identifying the stationary playback device with a highest probability as the predicted stationary playback device.

16. A non-transitory computer-readable medium provisioned with program instructions that, when executed by at least one processor, cause a user device to:
after receipt of context data comprising localization data that describes a location of the user device, identify a predicted stationary playback device from a plurality of stationary playback devices in a media playback system using a prediction model that takes the context data as input and predicts a predicted stationary playback device as output;
update a graphical user interface displayed on a touch-screen display of the user device based on the predicted stationary playback device;
detect, via the touch-screen display, an input identifying a target stationary playback device from the plurality of stationary playback devices;
after detection of the input identifying the target stationary playback device, cause the target stationary playback device to perform at least one operation;
generate training data based on the predicted stationary playback device and the detected input; and
update the prediction model based on the generated training data, wherein updating the prediction model comprises:
computing a loss based, wherein the loss is derived from and inversely proportional to a confidence level that the predicted stationary playback device is the target stationary playback device; and
updating weights of the prediction model based on the computed loss.

17. The method of claim 14, further comprising ranking at least a subset of the plurality of stationary playback devices based on the generated probabilities for each stationary playback device.

18. The method of claim 17, wherein updating the graphical user interface displayed on the touch-screen display comprises:
updating the graphical user interface displayed on the touch-screen display based on the ranking of at least the subset of the plurality of stationary playback devices.

19. The method of claim 17, wherein updating the graphical user interface displayed on the touch-screen display further comprises:
updating the graphical user interface to comprise an order listing of at least some of the plurality of stationary playback devices based on the ranking of at least the subset of the plurality of stationary playback devices.

20. The method of claim 13, wherein detecting the input identifying the target stationary playback device comprises detecting, via the touch-screen display, a control command for the target stationary playback device.

21. The method of claim 20, wherein the control command comprises a command to perform one or more of: modifying a volume setting, modifying an equalization setting, initiating playback, or pausing playback.

* * * * *